United States Patent
Faramarzi et al.

(10) Patent No.: US 11,665,372 B2
(45) Date of Patent: May 30, 2023

(54) FAST PROJECTION METHOD IN VIDEO-BASED POINT CLOUD COMPRESSION CODECS

(71) Applicant: Samsung Electronics Co., Ltd., Suwon-si (KR)

(72) Inventors: Esmaeil Faramarzi, Richardson, TX (US); Madhukar Budagavi, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/734,122

(22) Filed: Jan. 3, 2020

(65) Prior Publication Data

US 2020/0221134 A1  Jul. 9, 2020

Related U.S. Application Data

(60) Provisional application No. 62/789,430, filed on Jan. 7, 2019, provisional application No. 62/790,241, filed (Continued)

(51) Int. Cl.
*H04N 19/88* (2014.01)
*G06T 9/00* (2006.01)
(Continued)

(52) U.S. Cl.
CPC .......... *H04N 19/85* (2014.11); *H04N 19/136* (2014.11); *H04N 19/597* (2014.11)

(58) Field of Classification Search
CPC .... H04N 19/85; H04N 19/136; H04N 19/597; H04N 19/88
See application file for complete search history.

(56) References Cited

U.S. PATENT DOCUMENTS 5,504,847 A * 4/1996 Kimura .................. G06T 17/20
                                                      345/420
7,120,289 B2 * 10/2006 Baumberg ............ G06T 15/205
                                                      382/154
(Continued)

FOREIGN PATENT DOCUMENTS

KR  101780762 B1 *  3/2016 ............... G06T 7/00
KR  10-1780762 B1 * 10/2016 ............... G06T 7/00
(Continued)

OTHER PUBLICATIONS

International Search Report dated Apr. 10, 2020 in connection with International Patent Application No. PCT/KR2020/000197, 3 pages.
(Continued)

*Primary Examiner* — Philip P. Dang

(57) ABSTRACT

An encoding device and a method for point cloud encoding are disclosed. The method for encoding includes segmenting an area including points representing a three-dimensional (3D) point cloud into multiple voxels. The method also includes identifying a normal score for each of the points of the 3D point cloud and a smoothing score for each of the multiple voxels that include at least one of the points of the 3D point cloud. The method further includes grouping each point of the 3D point cloud to one of multiple projection planes based on the normal score and the smoothing score to generate refined patches that represent the 3D point cloud. Additionally, the method includes generating frames that include pixels that represent the refined patches. The method also includes encoding the frames to generate a bitstream and transmitting the bitstream.

16 Claims, 15 Drawing Sheets

Related U.S. Application Data on Jan. 9, 2019, provisional application No. 62/821,124, filed on Mar. 20, 2019, provisional application No. 62/823,352, filed on Mar. 25, 2019.

(51) Int. Cl.
*H04N 19/85* (2014.01)
*H04N 19/136* (2014.01)
*H04N 19/597* (2014.01)

(56) References Cited

U.S. PATENT DOCUMENTS

| | | | | |
|---|---|---|---|---|
| 7,399,220 | B2* | 7/2008 | Kriesel | A22B 5/201 |
| | | | | 452/157 |
| 7,538,764 | B2* | 5/2009 | Salomie | G06T 17/20 |
| | | | | 380/232 |
| 7,545,384 | B2* | 6/2009 | Baumberg | G06T 15/04 |
| | | | | 345/582 |
| 8,199,985 | B2* | 6/2012 | Jakobsson | G06V 10/7553 |
| | | | | 382/199 |
| 8,358,818 | B2* | 1/2013 | Miga | A61B 90/36 |
| | | | | 600/407 |
| 8,436,853 | B1* | 5/2013 | Hickman | G06T 17/00 |
| | | | | 345/419 |
| 8,577,176 | B2* | 11/2013 | Kotake | G06T 7/80 |
| | | | | 382/154 |
| 8,773,431 | B2* | 7/2014 | Joshi | G06T 17/00 |
| | | | | 345/643 |
| 8,948,501 | B1* | 2/2015 | Kim | G01S 7/4808 |
| | | | | 382/173 |
| 9,327,406 | B1* | 5/2016 | Hinterstoisser | B25J 9/1697 |
| 9,443,297 | B2* | 9/2016 | Beaudoin | G06T 7/74 |
| 9,630,320 | B1* | 4/2017 | Konolige | G06T 17/00 |
| 9,697,606 | B2* | 7/2017 | Stout | G06T 7/521 |
| 9,826,234 | B1* | 11/2017 | LeGall | H04N 19/149 |
| 10,062,207 | B2* | 8/2018 | Huang | G06T 17/20 |
| 10,089,750 | B2* | 10/2018 | Ho | G06T 7/593 |
| 10,136,830 | B2* | 11/2018 | Geva | G16H 50/50 |
| 10,482,621 | B2* | 11/2019 | Hoelscher | G06T 19/00 |
| 10,572,770 | B2* | 2/2020 | Park | G06K 9/6276 |
| 10,670,416 | B2* | 6/2020 | Wheeler | G06T 17/00 |
| 10,748,027 | B2* | 8/2020 | Shtok | G06T 7/33 |
| 10,825,199 | B2* | 11/2020 | Bogan | G06T 7/75 |
| 10,827,190 | B1* | 11/2020 | Blasch | H04N 19/85 |
| 10,834,391 | B2* | 11/2020 | Chou | G06T 15/08 |
| 10,846,563 | B2* | 11/2020 | Liu | G06F 17/16 |
| 10,867,430 | B2* | 12/2020 | Lucas | G06T 17/00 |
| 10,878,299 | B2* | 12/2020 | Hoelscher | G06T 7/75 |
| 10,893,299 | B2* | 1/2021 | Boyce | G06T 7/557 |
| 2007/0288540 | A1* | 12/2007 | Tsafrir | G16B 40/30 |
| | | | | 708/300 |
| 2011/0115787 | A1* | 5/2011 | Kadlec | G06T 7/12 |
| | | | | 702/14 |
| 2011/0164037 | A1 | 7/2011 | Yoshida et al. | |
| 2018/0188059 | A1 | 7/2018 | Wheeler et al. | |
| 2018/0268570 | A1* | 9/2018 | Budagavi | G06T 9/001 |
| 2019/0145765 | A1* | 5/2019 | Luo | G06V 10/454 |
| | | | | 702/153 |
| 2020/0219275 | A1* | 7/2020 | Cai | G06T 7/10 |
| 2020/0380765 | A1* | 12/2020 | Thudor | G06T 15/04 |

FOREIGN PATENT DOCUMENTS

| | | |
|---|---|---|
| KR | 10-2017-0103081 A | 9/2017 |
| KR | 10-2018-0014677 A | 2/2018 |
| WO | 2018/234206 A1 | 12/2018 |

OTHER PUBLICATIONS

Written Opinion of the International Searching Authority dated Apr. 10, 2020 in connection with International Patent Application No. PCT/KR2020/000197, 4 pages.

Faramarzi et al., "[V-PCC] [New Proposal] on Complexity Reduction of TMC2 Encoder", ISO/IEC JTC1/SC29/WG11 MPEG2018/m46201, Jan. 2019, 5 pages.

Faramarzi et al., "[V-PCC] CE2.27 Report on Encoder's Speedup", ISO/IEC JTC1/SC29/WG11 MPEG2019/m49587, Jul. 2019, 7 pages.

* cited by examiner

FAST PROJECTION METHOD IN VIDEO-BASED POINT CLOUD COMPRESSION CODECS

CROSS-REFERENCE TO RELATED APPLICATION AND CLAIM OF PRIORITY

This application claims priority under 35 U.S.C. § 119(e) to U.S. Provisional Patent Application No. 62/789,430 filed on Jan. 7, 2019; U.S. Provisional Patent Application No. 62/790,241 filed on Jan. 9, 2019; U.S. Provisional Patent Application No. 62/821,124 filed on Mar. 20, 2019; and U.S. Provisional Patent Application No. 62/823,352 filed on Mar. 25, 2019. The above-identified provisional patent applications are hereby incorporated by reference in its entirety.

TECHNICAL FIELD

This disclosure relates generally to multimedia data. More specifically, this disclosure relates to an apparatus and a method for compressing point clouds.

BACKGROUND

Three hundred sixty degree (360°) video is emerging as a new way of experiencing immersive video due to the ready availability of powerful handheld devices such as smartphones. 360° video enables immersive "real life," "being there" experience for consumers by capturing the 360° view of the world. Users can interactively change their viewpoint and dynamically view any part of the captured scene or object they desire. Display and navigation sensors can track head movement of the user in real-time to determine the region of the 360° video that the user wants to view. Multimedia data that is three-dimensional (3D) in nature, such as point clouds, can be used in the immersive environment.

Point clouds are a set of points in 3D space that represent an object. Point clouds are common in a variety of applications such as gaming, 3D maps, visualizations, medical applications, augmented reality, virtual reality, autonomous driving, multi-view replay, 6 degrees of freedom (DoF) immersive media, to name a few. Point clouds, if uncompressed, generally require a large amount of bandwidth for transmission. Due to the large bitrate requirement, point clouds are often compressed prior to transmission. Compressing a 3D object such as a point cloud often requires specialized hardware. To avoid specialized hardware to compress a 3D point cloud, a 3D point cloud can be manipulated onto traditional two-dimensional (2D) frames that can be compressed and reconstructed on a different device in order to be viewed by a user.

SUMMARY

This disclosure provides fast projection method in video-based point cloud compression codecs.

In one embodiment an encoding device is provided. The encoding device includes a processor and a communication interface. The processor is configured to segment an area including points representing a 3D point cloud into multiple voxels. The processor is also configured to identify a normal score for each of the points of the 3D point cloud and a smoothing score for each of the multiple voxels that include at least one of the points of the 3D point cloud. The processor is further configured to group each point of the 3D point cloud to one of multiple projection planes based on the normal score and the smoothing score to generate refined patches that represent the 3D point cloud. Additionally, the processor is configured to generate frames that include pixels that represent the refined patches. The encoder also encodes the frames to generate a bitstream. The communication interface processor is configured to transmit the bitstream.

In another embodiment, a method for point cloud encoding is provided. The method includes segmenting an area including points representing a 3D point cloud into multiple voxels. The method also includes identifying a normal score for each of the points of the 3D point cloud and a smoothing score for each of the multiple voxels that include at least one of the points of the 3D point cloud. The method further includes grouping each point of the 3D point cloud to one of multiple projection planes based on the normal score and the smoothing score to generate refined patches that represent the 3D point cloud. Additionally, the method includes generating frames that include pixels that represent the refined patches. The method also includes encoding the frames to generate a bitstream and transmitting the bitstream.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
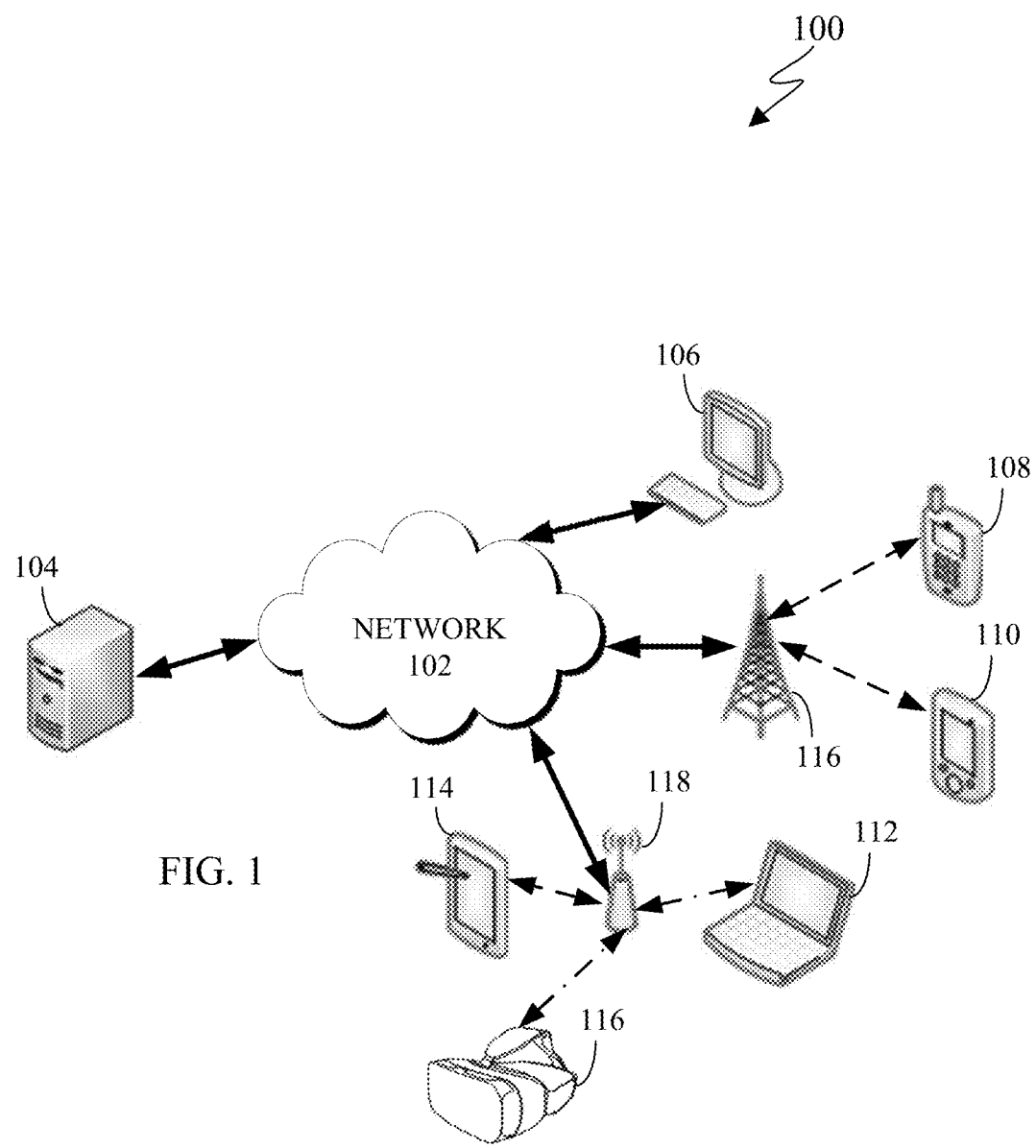
FIG. 1 illustrates an example communication system in accordance with an embodiment of this disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Augmented reality (AR) is an interactive experience of a real world environment where objects that reside in the real-world environment are augmented with virtual objects, virtual information, or both. Virtual reality (VR) is a rendered version of a visual scene, where the entire scene is computer generated. In certain embodiments, AR and VR include both visual and audio experiences. A visual rendering is designed to mimic the visual stimuli, and if available audio sensory stimuli, of the real world as naturally as possible to an observer or user as the user moves within the limits defined by the application or the AR or VR scene. For example, VR places a user into immersive worlds that respond to the head movements of a user. At the video level, VR is achieved by providing a video experience that covers as much of the field of view (FOV) as possible together with the synchronization of the viewing angle of the rendered video with the head movements.

Many different types of devices are able to provide the immersive experience associated with AR or VR. One example device is a head-mounted display (HMD). A HMD represents one of many types of devices that provide AR and VR experiences to a user. A HMD is a device that enables a user to view the VR scene and adjust the displayed content based on movements of the head of the user. Typically, a HMD relies either on a dedicated screen that is integrated into a device and connected with an external computer (tethered) or on a device, such as a smartphone, that is inserted into the HMD (untethered). The first approach utilizes one or more lightweight screens and benefits from a high computing capacity. In contrast, the smartphone-based systems utilize higher mobility and can be less expensive to produce. In both instances, the video experience generated is the same. It is noted that as used herein, the term "user" may denote a human or another device (such as an artificial intelligent electronic device) using the electronic device.

A point cloud is a virtual representation of an object in three dimensions. For example, a point cloud is a collection of points in 3D space, and each point is positioned in a particular geometric position within 3D space and includes one or more attributes such as color (also referred to as texture). A point cloud can be similar to a virtual object in a VR or AR environment. A mesh is another type of a virtual representation of an object in a VR or AR environment. A point cloud or a mesh can be an object, multiple objects, a virtual scene (which includes multiple objects), and the like. Point clouds and meshes are commonly used in a variety of applications, including gaming, 3D mapping, visualization, medicine, AR, VR, autonomous driving, multi-view replay, 6 DoF immersive media, to name a few. As used herein, the terms point clouds and meshes can be used interchangeably.

Point clouds represent volumetric visual data. Point clouds consist of multiple points positioned in 3D space, where each point in a 3D point cloud includes a geometric position represented by 3-tuple (X,Y,Z) coordinate values. When each point is identified by the three coordinates, a precise location in 3D environment or space is identified. The location in a 3D environment or space of each point can be relative to an origin, other points of the point cloud, or a combination thereof. The origin is a location where the X, Y, and Z axis intersect. In some embodiments, the points are positioned on the external surface of the object. In other embodiments, the points are positioned throughout both the internal structure and external surface of the object. In yet other embodiments, the points are positioned along the surface of the object and can be positioned within the internal area of the point cloud In addition to the geometric position of a point (the location of the point in 3D space), each point in the point cloud can also include attributes such as color (also referred to as texture), reflectance, intensity, surface normal, and the like. In some embodiments, a single point of a 3D point cloud can have multiple attributes. In some applications, point clouds can also be used to approximate light field data in which, each point includes multiple view-dependent, color information (R, G, B or Y, U, V triplets).

A single point cloud can include billions of points, with each point associated with a geometric position and one or more attributes. A geometric position and each additional attribute that is associated with a point occupy a certain number of bits. For example, a geometric position of a single point in a point cloud can consume thirty bits. For instance, if each geometric position of a single point is defined with an X value, a Y value, and a Z value, then each coordinate (the X, the Y, and the Z) uses ten bits, totaling the thirty bits. Similarly, an attribute that specifies the color of a single point can consume twenty-four bits. For instance, if a color component of a single point is defined based on a Red value, Green value, and Blue value, then each color component (Red, Green, and Blue) uses eight bits, totaling the twenty-four bits. As a result, a single point with a ten-bit geometric attribute data, per coordinate, and an eight-bit color attribute data, per color value, occupies fifty-four bits. Each additional attribute increases the bits required for a single point. If a frame includes one million points, the number of bits per frame is fifty-four million bits (fifty-four bits per point times one million points per frame). If the frame rate is thirty frames per second and undergoes no compression, then 1.62 gigabytes per second (fifty-four million bits per frame times thirty frames per second) are to be transmitted from one electronic device to another in order for the second device to display the point cloud. Therefore, transmitting an uncompressed point cloud from one electronic device to another uses significant bandwidth due to the size and complexity of the data associated with a single point cloud. As a result, the point cloud is compressed prior to the transmission.

Embodiments of the present disclosure take into consideration that compressing a point clouds is necessary to expedite and improve transmission of the point cloud from one device (such as a source device) to another device (such as a display device) due to the bandwidth necessary to transmit the point cloud. Certain dedicated hardware components can be used to meet the real-time demands or reduce delays or lags in the transmitting and rendering a 3D point cloud; however such hardware components are often expensive. Additionally, many video codecs are not able to encode and decode 3D video content, such as a point cloud. Compressing and decompressing a point cloud by leveraging existing 2D video codecs enables the encoding and decoding of a point cloud to be widely available without the need for new or specialized hardware. According to embodiments of the present disclosure, leveraging existing video codecs can be used to compress and reconstruct a point cloud, when the point cloud is converted from a 3D representation to a 2D representation. In certain embodiments, the conversion of a point cloud from a 3D representation to a 2D representation includes projecting clusters of points of the 3D point cloud onto 2D frames by creating patches. Thereafter, video codecs such as HEVC, AVC, VP9, VP8, VVC, and the like can be used to compress the 2D frames representing the 3D point cloud similar to a 2D video.

Figure 4A:
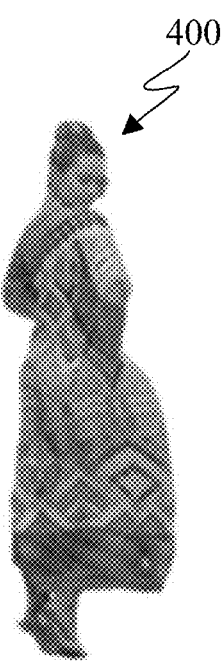
FIG. 4A illustrate an example 3D point cloud in accordance with an embodiment of this disclosure.
Figure 4B:
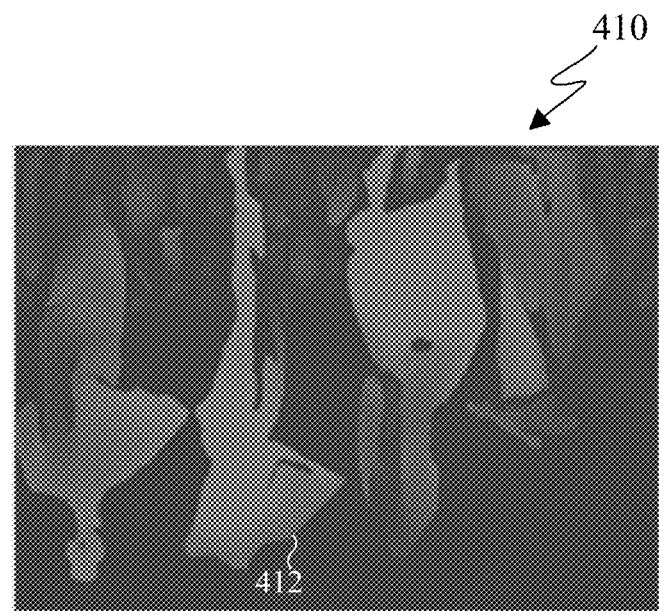
FIGS. 4B and 4C illustrate example 2D frames that include patches representing the 3D point cloud of FIG. 4A in accordance with an embodiment of this disclosure.
Figure 4C:
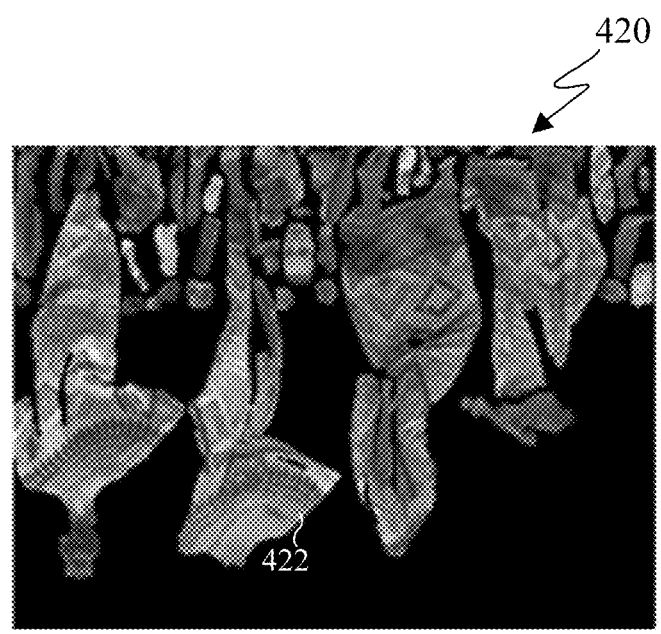
Figure 4D:
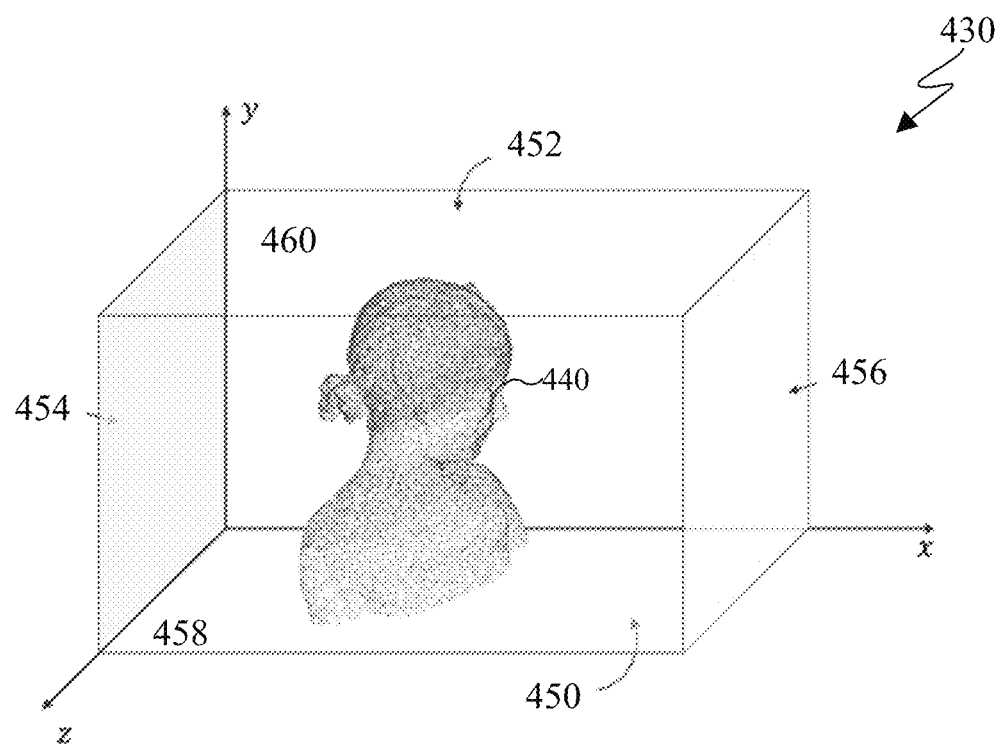
FIG. 4D illustrates a diagram of a point cloud that is surrounded by multiple projection planes in accordance with an embodiment of this disclosure.

To transmit a point cloud from one device to another, the 3D point cloud is represented as patches on 2D frames. The 2D frames can include projections of the 3D point cloud with respect to different projection planes. The frames can also represent different attributes of the point cloud, such as one frame includes values representing geometry positions of the points and another frame includes values representing color information associated with each of the points. A decoder reconstructs the patches within the 2D frames into the 3D point cloud, such that the point cloud can be rendered, displayed, and then viewed by a user. When the point cloud is deconstructed to fit on multiple 2D frames and compressed, the frames can be transmitted using less bandwidth than used to transmit the original point cloud. FIGS. 4A-4C, which are described in greater detail below, illustrate a 3D point cloud that is projected onto 2D frames by creating patches of the point cloud and two attributes. FIG. 4D illustrates the process of projecting a 3D point cloud onto different planes.

Embodiments of the present disclosure provide systems and methods for converting a point cloud into a 2D representation that can be transmitted and then reconstructed into the point cloud for rendering. In certain embodiments, a point cloud is deconstructed into multiple patches, and multiple frames are generated that include the patches. In certain embodiments, a frame includes patches of the same attributes. The points of the 3D point cloud that are represented in one patch in one frame correspond to the same points that are represented in another patch in a second frame when the two patches are positioned at over the same coordinates. For example, a pixel at the position (u, v) in a frame that represents geometry is the geometry position of a pixel at the same (u, v) position in a frame that represents an attribute such as color. In other embodiments, the patches in one frame represent multiple attributes associated with the points of the point cloud, such as a geometric position of the points in 3D space and color.

An encoder can separate the geometry information and the attribute information from each point. The encoder groups (or clusters) the points of the 3D point cloud with respect to different projection planes, and then stores the groups of points as patches on a 2D frames. The patches representing the geometry and attribute information are packed into geometry video frames and attribute video frames, respectively, where each pixel within any of the patches corresponds to a point in 3D space. The geometry video frames are used to encode the geometry information, and the corresponding attribute video frames are used to encode the attribute (such as color) of the point cloud. The two transverse coordinates (with respect to the projection plane) of a 3D point corresponds to the column and row indices in the geometry video frame (u, v) plus a transverse-offset which determines the location of the entire patch within the video frame. The depth of the 3D point is encoded as the value of the pixel in the video frame plus a depth-offset for the patch. The depth of the 3D point cloud depends on whether the projection of the 3D point cloud is taken from the XY, YZ, or XZ coordinates.

In certain embodiments, the inter-patch space (the space between the projected patches) is filled using an image padding to reduce the number of sharp edges in the projected video frames and subsequently reduce the compression bitrate. The frames can be compressed by leveraging various video compression codecs, image compression codecs, or both. For example, the encoder first generates and then compresses the geometry frames using a 2D video codec such as HEVC. To encode an attribute frame (such as the color of the 3D point cloud), the encoder decodes the encoded geometry frame and which is used to reconstruct the 3D coordinates of the 3D point cloud. The encoder smoothes the reconstructed point cloud. Thereafter the encoder interpolates the color values of each point from the color values of input coordinates. The interpolated color values are then packed into a color frame which is compressed.

The encoder can also generate an occupancy map which shows the location of projected points in the 2D videos frames. In certain embodiments, the occupancy map frame is compressed. The compressed geometry frames, the compressed color frames (and any other attribute frame), and the occupancy map frame can be multiplexed to generate a bitstream.

The encoder or another device then transmits the bitstream that includes the 2D frames to a different device. A decoder receives the bitstream, decompresses the bitstream into the frames, and reconstructs the point cloud based on the information within the frames. After the point cloud is reconstructed, the 3D point cloud can be rendered and displayed for a user to observe. In certain embodiments, frames representing different attributes (including the geometric positions of the points) are encoded and decoded separately. In other embodiments, frames representing different attributes (including the geometric positions of the points) are encoded and decoded together.

Embodiments of the present disclosure provide systems and methods for improving the patch generation process. The projection process projects each point to one of the projection planes surrounding the point cloud. It is noted that any number and shape of projection planes can be used. Example shapes include cube, polygon, octagonal, cylindrical spherical, and the like.

The patch generation process includes an initial patch segmentation process, a refine segmentation process, and a patch segmentation process. The initial patch segmentation process clusters points of the point cloud certain projection planes based on the directional proximity of the normal vector of each point with respect to a normal vector of each of the projection planes. For example, during the initial patch segmentation process the encoder estimates the normal vectors that are perpendicular to the point cloud surface at the location of each point and then specifies a projection plane toward which the normal vector of each point is directed more closely towards.

According to embodiments of the present disclosure, the initial segmentation process can assign different projection planes to points that neighbor each other. When different projection planes are assigned to points that neighbor each other can result in scattered patches with jagged (unsmooth) edges in the projected 2D frames. Unsmoothed patches (due to jagged edges) that are included in the frames can increase the processing power necessary to encode the frames, create artifacts in the reconstructed point cloud, and reduce the compression performance of the point cloud codec. As such, the refine segmentation process smoothes the clustering of the points over the surface of the point cloud. After the clusters of points are smoothed, the patch generation process segments the points into patches based on the refined patches.

It is noted that the refine segmentation process has high computational complexity due to a large number of loops that are performed for smoothing in order to determine a particular projection plane for each point based on the normal vector of itself and of its neighboring points. For example, for a typical point cloud, the smoothing process can loop multiple times through each point, each of the projection planes, and each of the nearest neighbors. Based on the multiple parameters, the number of loops that are used to smooth a cloud of one million points can easily result in over a billion loops. A large number of loops use a large number of processing cycles on the hardware which can be challenging on certain electronic devices, such as mobile devices. As such, embodiments of the present disclosure provide systems and methods for a grid-based partitioning to reduce the computational complexity and the memory usage when generating the patches of a 3D point cloud.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and a HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display a 360° scene including one or more 3D point clouds. In certain embodiments, any of the client devices 106-116 can include an encoder, decoder, or both. For example, the mobile device 108 can record a video and then encode the video enabling the video to be transmitted to one of the client devices 106-116. In another example, the laptop computer 112 can be used to generate a virtual 3D point cloud, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud, generate a bitstream that represents the point cloud, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D point cloud, compress a 3D point cloud, transmit a 3D point cloud, receive a 3D point cloud, render a 3D point cloud, or a combination thereof. For example, the server 104 receives a 3D point cloud, decomposes the 3D point cloud to fit on 2D frames, compresses the frames to generate a bitstream. The bitstream can be transmitted to a storage device, such as an information repository, or one or more of the client devices 106-116. For another example, one of the client devices 106-116 can receive a 3D point cloud, decompose the 3D point cloud to fit on 2D frames, compress the frames to generate a bitstream that can be transmitted to a storage device, such as an information repository, another one of the client devices 106-116, or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
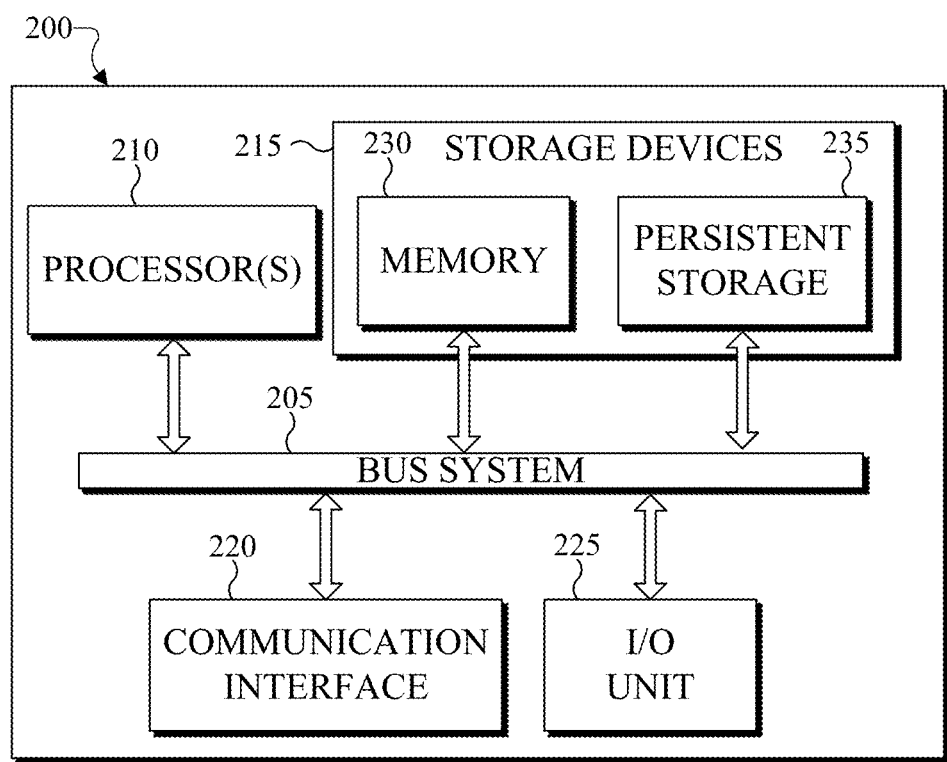
FIGS. 2 and 3 illustrate example electronic devices in accordance with an embodiment of this disclosure.
Figure 3:
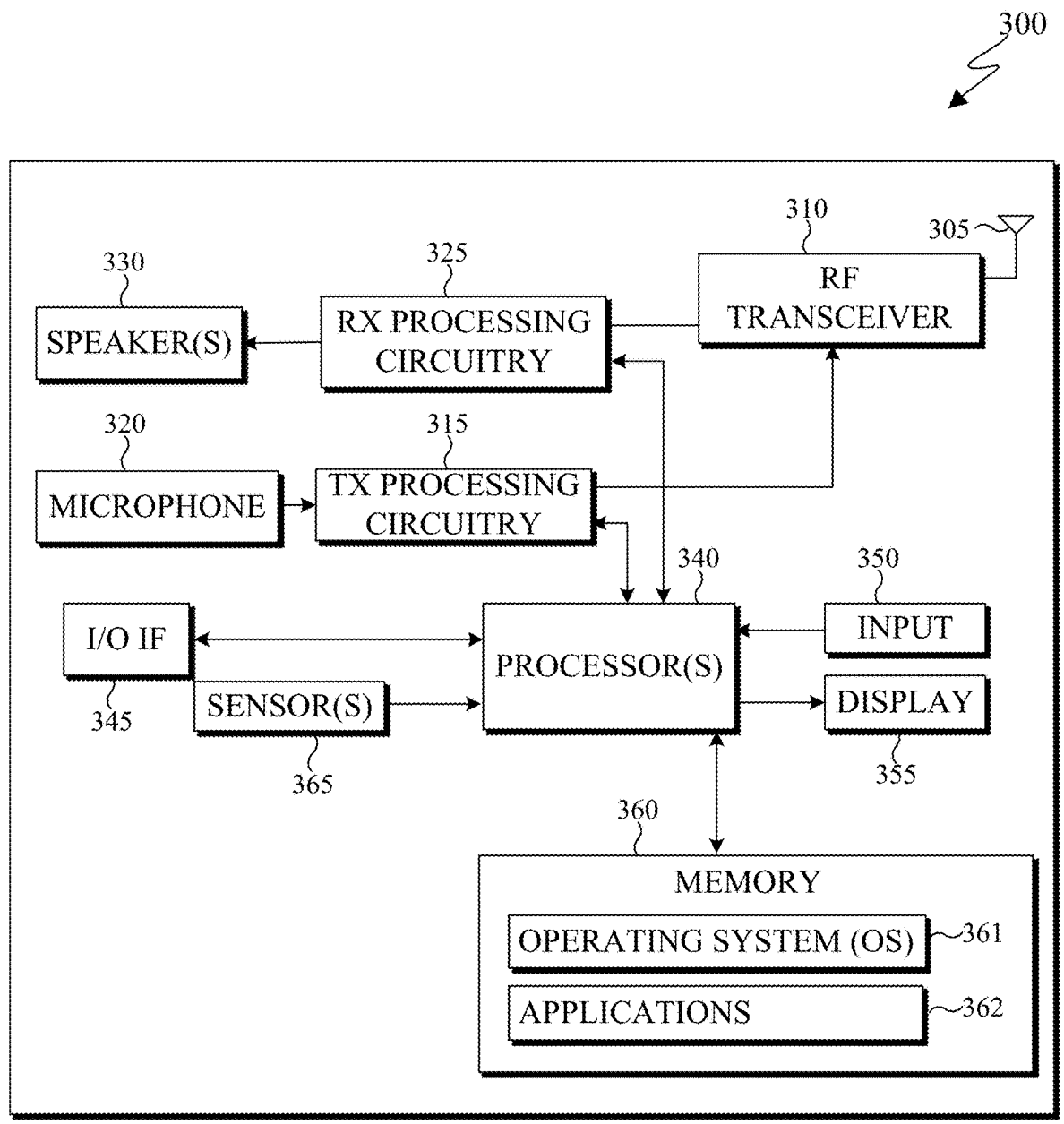

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

The server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can encode a 3D point cloud stored within the storage devices 215. In certain embodiments, when the 3D point cloud is encoded by an encoder, the encoder also decodes the encoded 3D point cloud to ensure that when the point cloud is reconstructed, the reconstructed 3D point cloud matches the 3D point cloud prior to the encoding.

The memory 230 and a persistent storage 235 are examples of storage devices 215 that represent any structure (s) capable of storing and facilitating retrieval of information (such as data, program code, or other suitable information on a temporary or permanent basis). The memory 230 can represent a random access memory or any other suitable volatile or non-volatile storage device(s). For example, the instructions stored in the memory 230 can include instructions for decomposing a point cloud into patches, instructions for packing the patches on 2D frames, instructions for compressing the 2D frames, as well as instructions for encoding 2D frames in a certain order in order to generate a bitstream. The instructions stored in the memory 230 can also include instructions for rendering a 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116.

For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within a HMD. The display 355 can be a singular display screen or multiple display screens capable of creating a stereoscopic display. In certain embodiments, the display 355 is a heads-up display (HUD). The display 355 can display 3D objects, such as a 3D point cloud.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generate a 3D point cloud or capture (or record) content through a camera. The electronic device 300 can encode the media content to generate a bitstream (similar to the server 200, described above), such that the bitstream can be transmitted directly to another electronic device or indirectly such as through the network 102 of FIG. 1. The electronic device 300 can receive a bitstream directly from another electronic device or indirectly such as through the network 102 of FIG. 1.

When encoding media content, such as a point cloud, the electronic device 300 can segment the 3D point cloud into multiple segments that form the patches that are stored in the 2D frames. For example, a cluster of points of the point cloud can smoothed and then be grouped together to generate a patch. A patch can represent a single aspect of the point cloud, such as geometry, one or more attributes (such as color, and the like). Patches that represent the same attribute can be packed into the same 2D frame. The 2D frames are then encoded to generate a bitstream. During the encoding process additional content such as metadata, flags, occupancy maps, and the like can be included in the bitstream.

Similarly, when decoding media content included in a bitstream that represents a 3D point cloud, the electronic device 300 decodes the received bitstream into frames. In certain embodiments, the decoded bitstream also includes an occupancy map, 2D frames, auxiliary information, and the like. A geometry frame can include pixels that indicate geographic coordinates of points of the point cloud in 3D space. Similarly, an attribute frame can include pixels that indicate the RGB (or YUV) color (or any other attribute) of each geometric point in 3D space. The auxiliary information can include one or more flags, or quantization parameter size, one or more thresholds, or any combination thereof. After reconstructing the 3D point cloud, the electronic device 300 can render the 3D point cloud in three dimensions via the display 355.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4E:
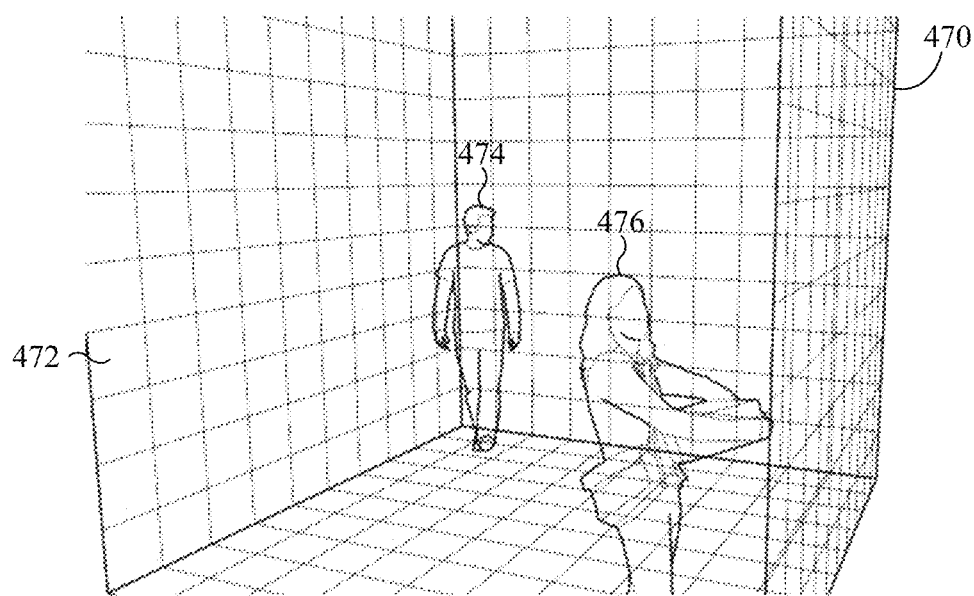
FIG. 4E illustrates an area that is segmented into multiple voxels and includes point clouds in accordance with an embodiment of this disclosure.

FIGS. 4A, 4B, 4C, 4D, and 4E illustrate various stages in generating frames that represent a 3D point cloud. For example, FIGS. 4A, 4B, and 4C illustrate an example 3D point cloud 400 and 2D frames 410 and 420 that represent the 3D point cloud 400 in accordance with an embodiment of this disclosure. In particular, FIG. 4A illustrates the 3D point cloud 400, and FIGS. 4B and 4C each illustrate a 2D frames that includes patches representing the 3D point cloud of FIG. 4A. For example, the FIG. 4B illustrates a 2D frame 410 that represents the geometric position of points of the 3D point cloud 400. The FIG. 4C illustrates the frame 420 that represents the color (or another attribute) associated with points of the 3D point cloud 400. FIG. 4D illustrates a diagram 430 illustrated a point cloud 440 that is surrounded by multiple projection planes in accordance with an embodiment of this disclosure. FIG. 4E illustrates an area 470 that is segmented into multiple voxels (such as voxel 472) and includes point clouds 474 and 476 in accordance with an embodiment of this disclosure. The embodiment of FIGS. 4A, 4B, 4C, 4D, and 4E are for illustration only and other embodiments could be used without departing from the scope of this disclosure.

The 3D point cloud 400 is a set of data points in 3D space. Each point of the 3D point cloud 400 a geometric position that provides the structure of the 3D point cloud and one or more attributes that provide information about each point such as color, reflectiveness, material, and the like.

FIGS. 4B and 4C illustrate the 2D frames 410 and 420 respectively. The frame 410 includes multiple patches (such as a patch 412) representing the depth values of the 3D point cloud 400. The value of each pixel in the frame 410 is represented as a lighter or darker color and corresponds to a distance each pixel is from the projection plane. The frame 420 includes multiple patches (such as a patch 422) representing the color of the 3D point cloud 400. Each pixel of color in the frame 420 corresponds to a particular geometry pixel in the frame 410. For example, a mapping is generated between each pixel in the frame 410 and the frame 420. As shown in the frames 410 and 420, some of the pixels correspond to valid pixels that represent the 3D point cloud 400 while other pixels (the black area in the background) correspond to invalid pixels that do not represent the 3D point cloud 400.

The location of the patches within the 2D frames 410 and 420 can be similar for a single position of the 3D point cloud. For example, as the 3D point cloud 400 changes, new frames can be generated with different patches based on the new position the 3D point cloud.

The diagram 430 of FIG. 4D includes a point cloud 440. The point cloud 440 can be similar to the 3D point cloud 400 of FIG. 4A. The point cloud 440 is surrounded by multiple projection planes, such as the projection plane 450, 452, 454, 456, 458, and 460. The projection plane 450 is separated from the projection plane 452 by a predefined distance. For example, the projection plane 450 corresponds to the projection plane XZ0 and the projection plane 452 corresponds to the projection plane XZ1. Similarly, the projection plane 454 is separated from the projection plane 456 by a predefined distance. For example, the projection plane 454 corresponds to the projection plane YZ0 and the projection plane 456 corresponds to the projection plane YZ1. Additionally, the projection plane 458 is separated from the projection plane 460 by a predefined distance. For example, the projection plane 458 corresponds to the projection plane XY0 and the projection plane 460 corresponds to the projection plane XY1. It is noted that additional projection planes can be included and the shape of that the projection planes form can differ.

Figure 6A:
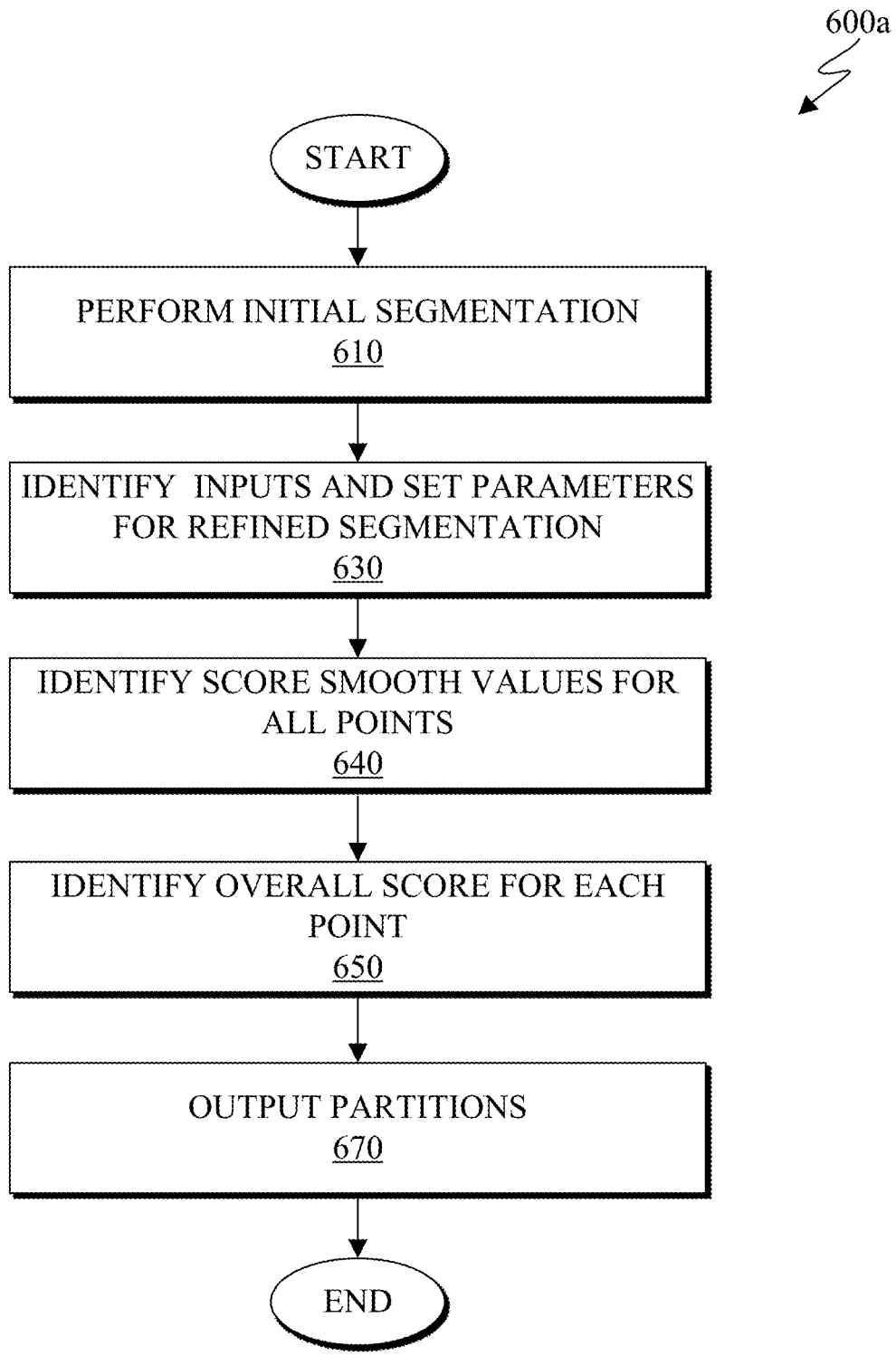
FIGS. 6A, 6B, 6C, and 6D illustrate example flowcharts for calculating scores to smooth the partition of points of the point cloud into different patches in accordance with an embodiment of this disclosure.
Figure 6B:
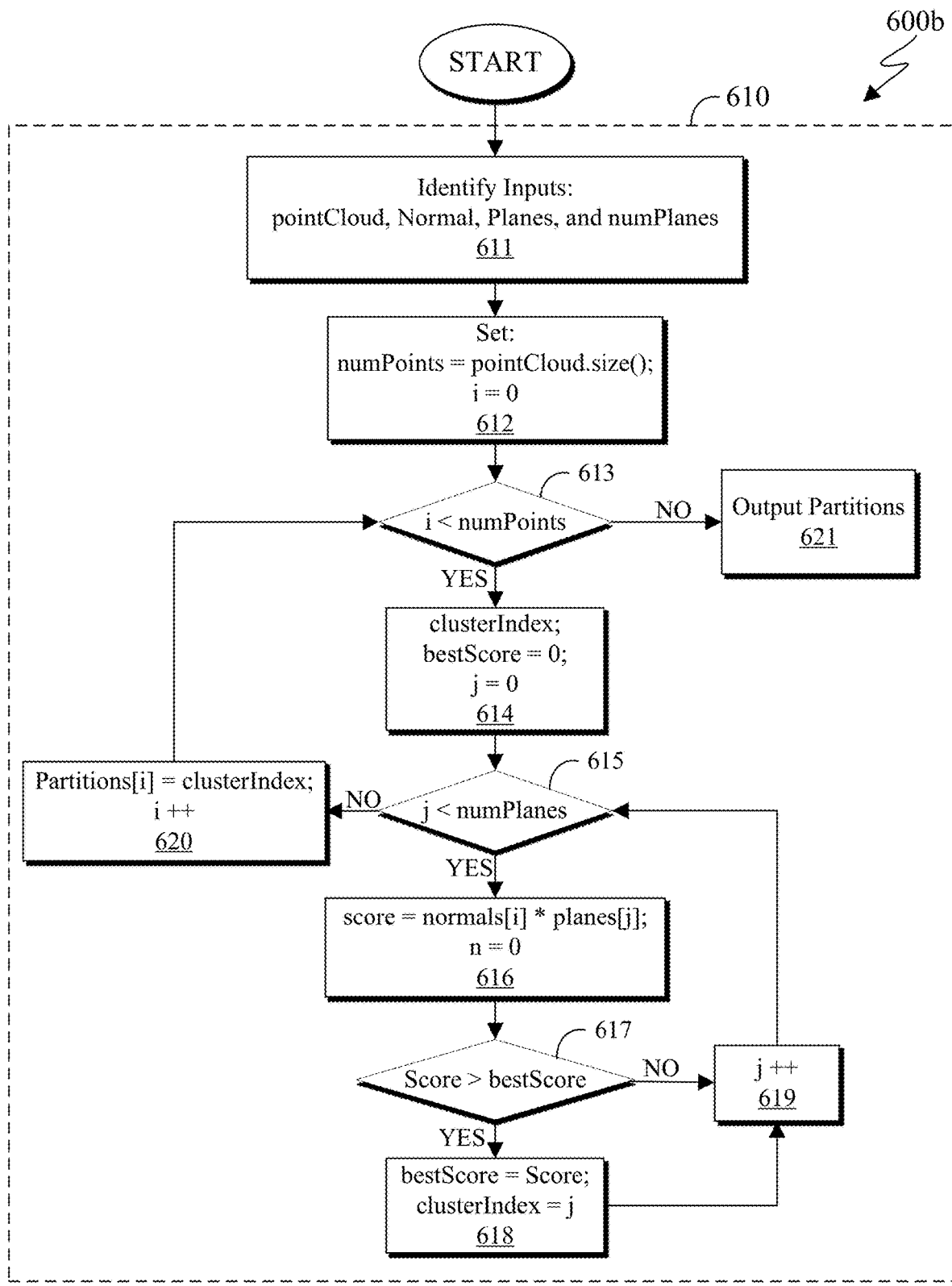

During the initial segmentation process, described above, multiple scores for each point are generated. Each score indicates how close the direction of a normal vector of the point (based on the surface of the point cloud 440) is with respect to each of the projection planes 450, 452, 454, 456, 458, and 460. For example, multiple sub-scores are assigned for each point with respect to each projection plane, where the score is the inner product of the normal vector of the one point and the unit vector of each plane. For instance, if there are six projection planes (as shown in diagram 430), the indices of projected planes could be integer numbers from 0 to 5. It is noted that the each of the multiple sub-scores relates the angle of the normal vector of the point with the angle of each projection plane, such that the projection plane that is selected for a particular point is based on projection plane whose angle is closest to the normal vector of the point. The plane having the largest sub-score is specified as the initial cluster index of that point. The score is often referred to as the Normal Score or scoreNormal. FIG. 6B, described below, discusses the initial segmentation process in greater detail.

FIG. 4E illustrates an area 470 that is segmented into multiple voxels, such as the voxel 472. That is, the area 470 is partitioned into a grid, where each cell of the grid corresponds to a single voxel, such as the voxel 472. For example, a 10-bit point cloud with a geometry in the range of [0, 1023], and the size of each voxel is 8×8×8, the overall grid size (area 470) would be 128×128×128, since 1024 (the geometry range) divided by 8 (the size of the voxel), yields the value 128.

The point cloud 474 and the point cloud 476 are within the area 470. Certain voxels include points of the point cloud 474 or the point cloud 476, while other voxels are empty. Filled voxels are voxels that include one or more points of a point cloud. In certain embodiments, an index is generated by the encoder. The index lists each of the voxels and indicates whether a voxel is empty or filled. The index can also identify each point of the point clouds 474 and 476 (by point number) that are included in each filled voxel. That is, the encoder can map the points of the point clouds 474 and 476 and record the indices of the points that are inside each filled voxel. For example, the index can state that the $100^{th}$ voxel includes the $5^{th}$ point, the $40^{th}$ point and the $10,200^{th}$ point, and the like.

In certain embodiments, the shape of the voxels can match the shape of the area 470. In other embodiments, the shape of the voxels can correspond to a different shape than the shape of the area 470. It is noted that the voxels do not overlap each other.

Although FIGS. 4A, 4B, 4C, 4D, and 4E illustrate example point cloud and 2D frames representing a point cloud various changes can be made to FIGS. 4A, 4B, 4C, 4D, and 4E. For example, a point cloud or mesh can represent a single object, whereas in other embodiments, a point cloud or mesh can represent multiple objects, scenery (such as a landscape), a virtual object in AR, and the like. In another example, the patches included in the 2D frames can represent other attributes, such as luminance, material, and the like. FIGS. 4A, 4B, 4C, 4D, and 4E do not limit this disclosure to any particular 3D object(s) and 2D frames representing the 3D object(s).

Figure 5A:
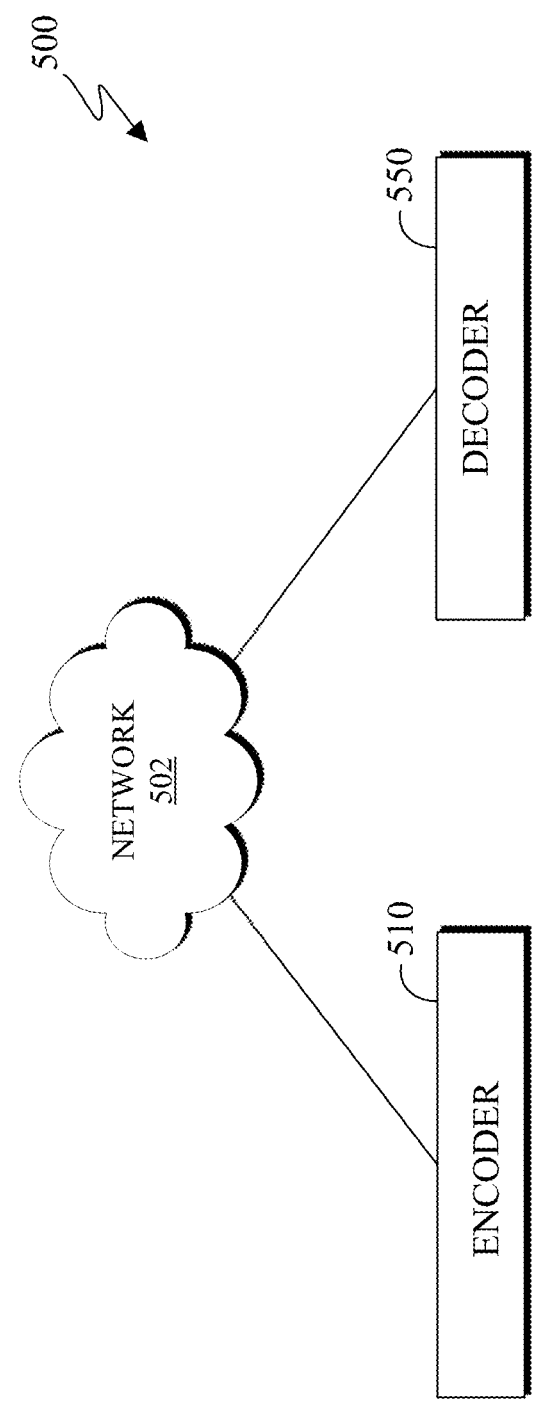
FIG. 5A illustrates a block diagram of an example environment-architecture in accordance with an embodiment of this disclosure.
Figure 5B:
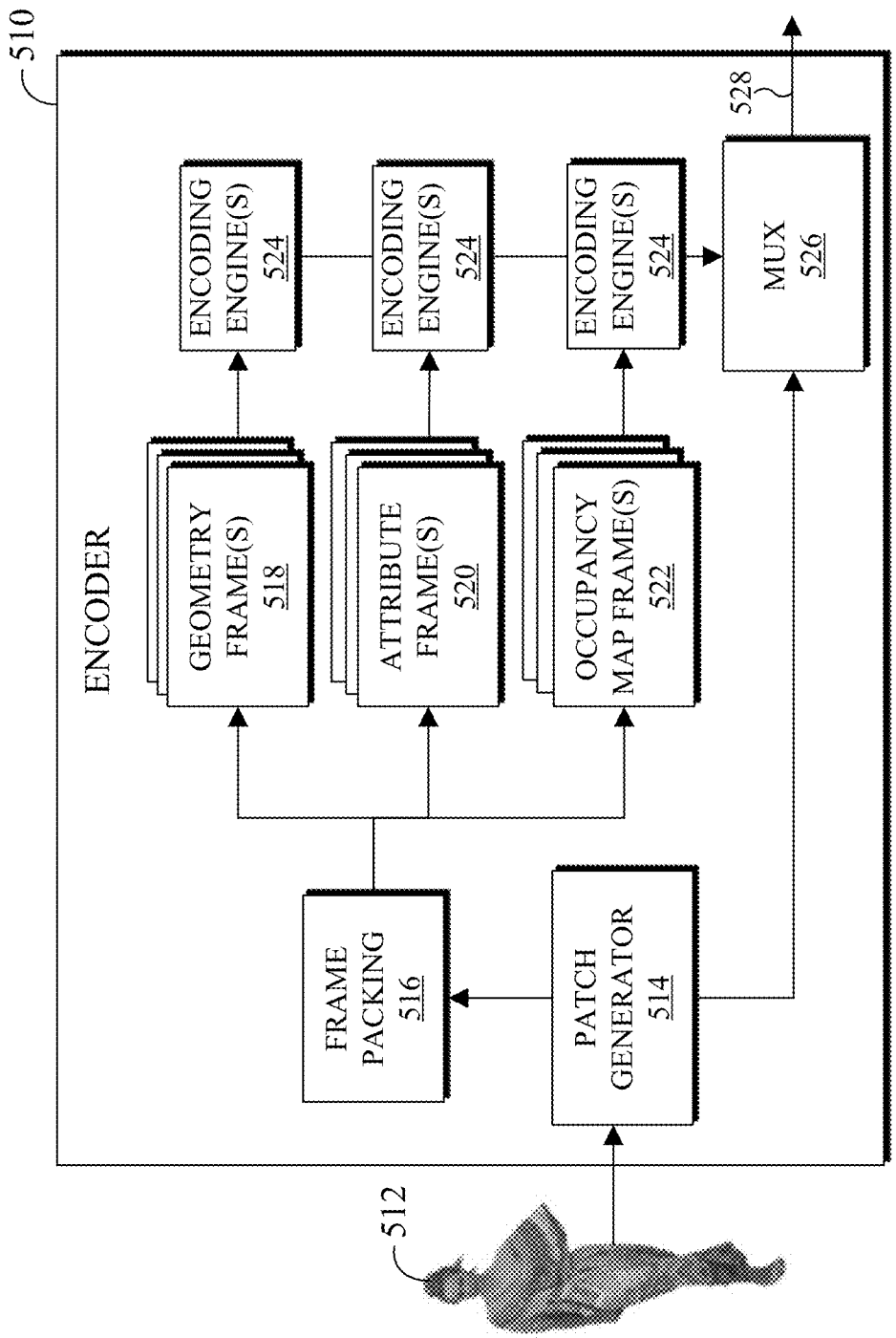
FIG. 5B illustrates an example block diagram of an encoder in accordance with an embodiment of this disclosure.
Figure 5C:
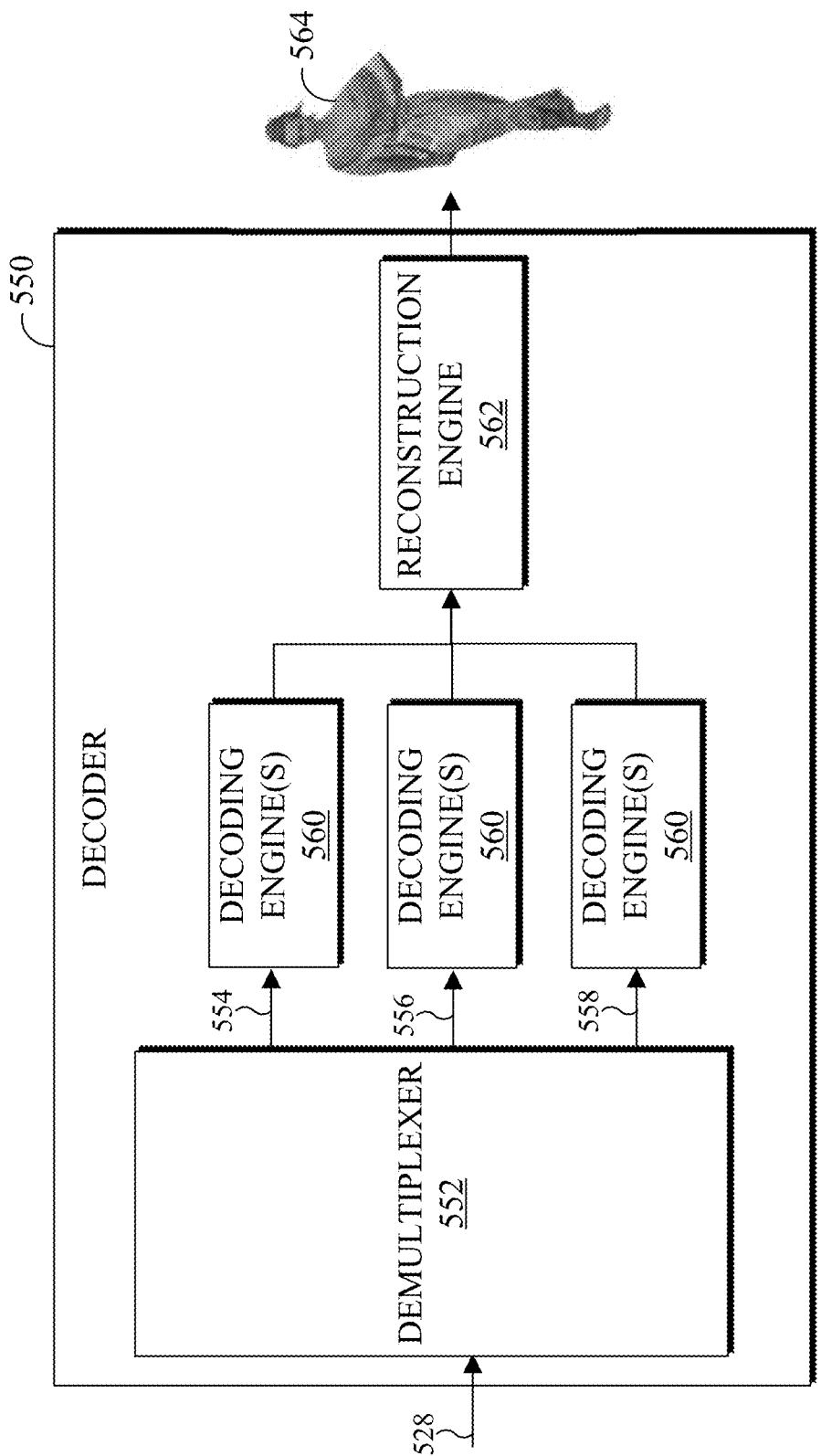
FIG. 5C illustrates an example block diagram of a decoder in accordance with an embodiment of this disclosure.

FIGS. 5A, 5B, and 5C illustrate block diagrams in accordance with an embodiment of this disclosure. In particular, FIG. 5A illustrates a block diagram of an example environment-architecture 500 in accordance with an embodiment of this disclosure. FIG. 5B illustrates an example block diagram of the encoder 510 of FIG. 5A and FIG. 5C illustrates an example block diagram of the decoder 550 of FIG. 5A in accordance with an embodiment of this disclosure. The embodiments of FIGS. 5A, 5B, and 5C are for illustration only. Other embodiments can be used without departing from the scope of this disclosure.

As shown in FIG. 5A, the example environment-architecture 500 includes an encoder 510 and a decoder 550 in communication over a network 502. The network 502 can be the same as or similar to the network 102 of FIG. 1. In certain embodiments, the network 502 represents a "cloud" of computers interconnected by one or more networks, where the network is a computing system utilizing clustered computers and components that act as a single pool of seamless resources when accessed. Also, in certain embodiments, the network 502 is connected with one or more servers (such as the server 104 of FIG. 1, the server 200), one or more electronic devices (such as the client devices 106-116 of FIG. 1, the electronic device 300), the encoder 510, and the decoder 550. Further, in certain embodiments, the network 502 can be connected to an information repository (not shown) that contains a VR and AR media content that can be encoded by the encoder 510, decoded by the decoder 550, or rendered and displayed on an electronic device.

In certain embodiments, the encoder 510 and the decoder 550 can represent the server 104, one of the client devices 106-116 of FIG. 1, the server 200 of FIG. 2, the electronic device 300 of FIG. 3, or another suitable device. In certain embodiments, the encoder 510 and the decoder 550 can be a "cloud" of computers interconnected by one or more networks, where each is a computing system utilizing clustered computers and components to act as a single pool of seamless resources when accessed through the network 502. In some embodiments, a portion of the components included in the encoder 510 or the decoder 550 can be included in different devices, such as multiple servers 104 or 200, multiple client devices 106-116, or other combination of different devices. In certain embodiments, the encoder 510 is operably connected to an electronic device or a server while the decoder 550 is operably connected to an electronic device. In certain embodiments, the encoder 510 and the decoder 550 are the same device or operably connected to the same device.

The encoder 510 is described with more below in FIG. 5B. Generally, the encoder 510 receives 3D media content, such as a point cloud, from another device such as a server (similar to the server 104 of FIG. 1, the server 200 of FIG. 2) or an information repository (such as a database), or one of the client devices 106-116. In certain embodiments, the encoder 510 can receive media content from multiple cameras and stitch the content together to generate a 3D scene that includes one or more point clouds.

The encoder 510 segments the points of the point cloud into multiple patches, based on the initial segmentation process and the refined segmentation process. The encoder 510 clusters points of a point cloud into groups based on the final score associated with each point, where the final score is based on the normal score and a smoothing score. Each cluster of points is represented by a patch on a 2D frame. It is noted, a point of the 3D point cloud is located in 3D space based on a (X,Y,Z) coordinate value, but when the point is projected onto a 2D frame the pixel representing the projected point is denoted by the column and row index of the frame indicated by the coordinate (u, v). Additionally, 'u' and 'v' can range from zero to the number of rows or columns in the depth image, respectively.

The encoder 510 packs the patches representing the point cloud onto 2D frames. The 2D frames can be video frames. Each of the 2D frames represents a particular attribute, such as one set of frames can represent geometry and another set of frames can represent an attribute (such as color). It should be noted that additional frames can be generated based on more layers as well as each additionally defined attribute.

The encoder 510 also generates an occupancy map based on the geometry frame and the attribute frame(s) to indicate which pixels within the frames are valid. Generally, the occupancy map indicates, for each pixel within a frame, whether the pixel is a valid pixel or an invalid pixel. For example, if a pixel in the occupancy map at coordinate (u, v) is valid, then the corresponding pixel in a geometry frame and the corresponding attribute frame at the coordinate (u, v) are also valid. If the pixel in the occupancy map at coordinate (u, v) is invalid, then the decoder skips the corresponding pixel in the geometry and attribute frames at the coordinate (u, v). In certain embodiments, the occupancy map at a position (u, v) can be one or zero. Generally the occupancy map is binary, such that the value of each pixel is either one or zero. When the value of a pixel at position (u, v) of the occupancy map is one indicates that a pixel at (u, v) of an attribute frame and the geometry frame is valid. In contrast, when the value of a pixel at position (u, v) of the occupancy map is zero indicates that a pixel at (u, v) of the attribute frame and the geometry frame is invalid.

The encoder 510 transmits frames representing the point cloud as an encoded bitstream. The bitstream can be transmitted to an information repository (such as a database) or an electronic device that includes a decoder (such as the decoder 550), or the decoder 550 itself through the network 502. The encoder 510 is described in greater detail below in FIG. 5B.

The decoder 550, which is described with more below in FIG. 5C, receives a bitstream that represents media content, such as a point cloud. The bitstreams can include data representing a 3D point cloud. In certain embodiments, the decoder 550 can decode the bitstream and generate multiple frames such as the geometry frame, the one or more attribute frames, and the occupancy map. The decoder 550 reconstructs the point cloud from the multiple frames (such as a geometry frame and one or more attribute frames), which can be rendered and viewed by a user.

FIG. 5B illustrates the encoder 510 that receives a 3D point cloud 512 and generates a bitstream 528. The bitstream 528 includes data representing a 3D point cloud 512. The bitstream 528 can include multiple bitstreams and can be transmitted via the network 502 of FIG. 5A to another device, such as the decoder 550 or an information repository. The encoder 510 includes a patch generator 514, a frame packing 516, various frames (such as one or more geometry frames 518, one or more attribute frames 520, and one or more occupancy map frames 522), one or more encoding engines 524, and a multiplexer 526.

The 3D point cloud 512 can be stored in memory (not shown) or received from another electronic device (not shown). The 3D point cloud 512 can be a single 3D object (similar to the point cloud 440 of FIG. 4D), or a grouping of 3D objects (similar to the point clouds 474 and 476 of FIG. 4E). The 3D point cloud 512 can be a stationary object or an object which moves.

The patch generator 514 generates patches by taking projections of the 3D point cloud 512. In certain embodiments, the patch generator 514 splits the geometry information and attribute information of each point of the 3D point cloud 512. The patch generator 514 can use three or more projection planes (similar to the projection plane 450, 452, 454, 456, 458, and 460 of FIG. 4D), to cluster the points of the 3D point cloud 512 to generate the patches.

The patch generator 514 determines the best projection plane for each point. After determining the best projection plane for each point the patch generator 514 also segments the points into patch data structures that can be packed by the frame packing 516 into the geometry frames 518 and the attribute frames 520.

To determine the best projection plane for each point, the patch generator 514 performs an initial segmentation of the points and then refines or smoothes the initial segmentation. Syntax (1), below, describes the initial segmentation process. The initial segmentation process is performed by estimating the normal vectors perpendicular to the surface of the point cloud at the location of each point and then specifying the projection plane toward which each normal vector is directed more closely. Then at each point, a score is assigned to each projection plane. This score indicates how close the normal vector is directed toward that plane. To calculate and identify the score, the patch generator 514 takes the inner product of the normal vector of a point and the unit vector of each plane. The patch generator 514, during the initial segmentation process, identifies the plane having the largest score as the initial cluster index of that point. For instance, if there are six projection planes, the indices of projected planes could be integer numbers from 0 to 5. The output would be a vector keeping the initial cluster indices for all points. FIGS. 6A and 6B describe the initial segmentation process.

```
Syntax                                          (1)
partition = initialSengmentation( normal, plane, numPlanes, numPoints )
{
    for (i = 0 to numPoints – 1) {
        bestScore = 0;
        for (j = 0 to numPlanes – 1) {
            normalScore = normals[i] * plane[j];
            if (normalScore > bestScore) {
                bestScore = normalScore;
                clusterindex = j;
            }
        }
        partition[i] = clusterIndex;
```

-continued

```
    }
}
```

The input parameters for Syntax (1) include the coordinates of points of the point cloud, the estimated normal vector for each point (syntax element normal), the unit vectors perpendicular to the projection planes (syntax element plane), the number of projection planes (syntax element numPlanes), and the number of points of the point cloud (syntax element numPoints). In certain embodiments, the syntax element, numPlanes, which identifies the number of projection planes, specifies that there are six projection planes (as illustrated in FIG. 4D). However, more or less than six projection planes can be used.

The initial segmentation process, as described in Syntax (1), above, and FIG. 6B, below, can assign different projection planes to the neighboring points. When different projection planes are assigned to neighboring points the patches are scattered with unsmoothed edges in the frames (such as the geometry frames 518 and the attribute frames 520. The patch generator 514 performs a refine segmentation process to smooth out the clustering of points over the surface of the point cloud after the initial segmentation process.

The patch generator 514 performs multiple iterations to refine (and smooth) the initial segmentation. In certain embodiments, to the initial segmentation the patch generator 514 identifies two scores for each point with respect to the various projection planes. The first score, scoreNormal (is the score assigned to the plane in the initial segmentation process), indicates how close the direction of normal vector (based on the surface of the point cloud) is with respect to a projected plane. The second score, scoreSmooth, specifies the number of neighboring points having the same partition index as the partition index of the current plane. That is, scoreSmooth specifies the number of the neighboring points (within a predetermined distance) that have a particular plane (that was identified in the initial segmentation process) as their initial projection plane as well. Each subsequent iteration (after the initial iteration), uses the updated partition numbers (clustering results) from the previous iteration. For example, the input to the first iteration is the output of the initial segmentation, then the input for the second iteration is the output of the first iteration, then the input for the third iteration is the output of the second iteration, and so on. In certain embodiments, scoreSmooth specifies the proportion of the neighboring points (within a predetermined distance) instead of a number of neighboring points. The patch generator 514 identifies a final score of a point based on the linear combination of the two scores using the input smoothing weight parameter lambda over the number of nearest neighbors for that point. The division over the number of nearest neighbors in the weight parameter normalizes the scoreSmooth between 0 and 1.

In certain embodiments, the patch generator 514 identifies the scoreNormal and the scoreSmooth separately. For example, FIG. 6C, discussed in greater detail below, describes the patch generator 514 identifying the scoreSmooth values for all of the points of the 3D point cloud. The scoreSmooth values are stored in a vector which is used to identify the final score in the FIG. 6D, also discussed in greater detail below. Syntax (2) below, describes the patch generator 514 identifying the scoreNormal and the scoreSmooth separately.

```
Syntax                                              (2)
partition = refineSegmentationLC ( geometry, kdTree, partition, normal,
                                   plane, numPoints, numPlanes,
                                   numNeighbors, numIters, lambda )
{
    w = lambda / numNeighbors;
    // Find the neighboring points of each point.
    neighbors = findNeighbors( geometry, kdTree );
    for (k = 0 to numRepeatition - 1) {
        // Block to identify a vector of scoreSmooth values
        for (i = 0 to numPoints - 1) {
            scoresSmooth[i][ ] = { 0 };
            for (j = 0 to numNeighbors - 1) {
                scoresSmooth[partition[neighbors[i][j]]]++;
            }
        }
        // Block to identify the final score
        for (i = 0 to numPoints - 1) {
            bestScore = 0;
            for (j = 0 to numPlanes - 1) {
                scoreNormal = normal[i] * plane[j];
                score = scoreNormal + w * scoresSmooth[j];
                if (score > bestScore) {
                    bestScore = score;
                    clusterIndex = j;
                }
            }
            tmpPartition[i] = clusterIndex;
        }
        partition = tmpPartition;
    }
}
```

The input parameters for Syntax (2), as shown above, include (i) the coordinates of points (syntax element geometry), (ii) a data structure (syntax element kdTree), (iii) the initial clustering indices estimated by the initial segmentation process (syntax element partition), (iv) the unit vectors of projected planes (syntax element normal), (v) the geometric positioning of the projection planes (syntax element plane), (vi) the number of points within the point cloud (syntax element numPoints), (vii) the number of projected planes (syntax element numPlane), (viii) the maximum number of neighboring points of each point to be returned by the data structure (syntax element numNeighbors), (ix) the number of repetitions (syntax element numIters), and (x) a constant to control the level of smoothness (syntax element lambda). In certain embodiments, another input parameter for Syntax (2) can also specify a radius for nearest-neighbor searching.

In certain embodiments, the syntax element, data structure, can specify a KD-Tree which can be used to find the neighboring points of each point. In certain embodiments, the syntax element, numRepeatition, can indicate that the refineSegmentation syntax is repeated multiple times. For example, the syntax element, numRepeatition, can be set to 100, indicating the patch generator 514 refines the initial segmentation 100 times. In certain embodiments, the syntax element, numPoints, corresponds the number of points within the point cloud. For example, a typical point cloud can include a million points. In certain embodiments, the syntax element, numPlanes, identifies the number of projection planes. In certain embodiments, there are six projection planes (as illustrated in FIG. 4D). It is noted, that more or less than six projection planes can be used. The syntax element, numNeighbors, specifies a predetermined number of neighboring points that are used when smoothing a single point. For example, the patch generator 514 can specifies that the syntax element, numNeighbors, corresponds to 256 neighboring points. The syntax expression w=lambda/numNeighbors normalizes the scoreSmooth.

As shown in Syntax (2), above, there is one block that identifies the scoreSmooth value of each point and another block that identifies the finalScore. The block to identify the scoreSmooth value has three nested loops based on the number of repetitions (iterations) that are performed to generate the smoothScore, the number of points of the point cloud and the predefined number of neighboring points for each point of the point cloud. Similarly, the block to identify the finalScore also has three nested loops based on the number of repetitions (iterations), the number of points in the point cloud, and the number of projection planes. For example, the syntax element scoresSmooth[partition[neighbors[i][j]]]++ indicates that the loops use the partition number as an index for smoothScore in order to enumerate the smoothed score of different projection planes.

In certain embodiments, the patch generator 514 creates a grid over an area that includes the 3D point cloud 512 in addition to identifying the scoreNormal and the scoreSmooth separately. To create the grid, the patch generator 514 segments the area including the 3D point cloud 512 into multiple cells, referred to as voxels. For example, the patch generator 514 partitions the 3D space into a uniform 3D grid, where each cell of the grid is denoted as a voxel. Once the 3D area is segmented into multiple voxels, the patch generator 514 identifies the voxels that include points of the point cloud. Additionally, the patch generator 514 can create an index that identifies the points that are within each voxel.

The patch generator 514 can identify a scoreNormal of the points of the 3D point cloud 512 as well as a scoreSmooth of each voxel (that includes at least one point of the 3D point cloud 512). The scoreSmooth of a particular voxel is based on multiple voxels. For example, a voxSmoothScore is identified for each voxel and the scoreSmooth of a particular voxel is based on the voxSmoothScore of the voxels that neighbor the particular voxel and the voxSmoothScore of the particular voxel. That is, one scoreSmooth is identified for the points within each voxel, based on the points within the particular voxel and the points within its neighboring voxels. In certain embodiments, the neighboring voxels are identified using a KD-Tree partitioning.

Figure 7A:
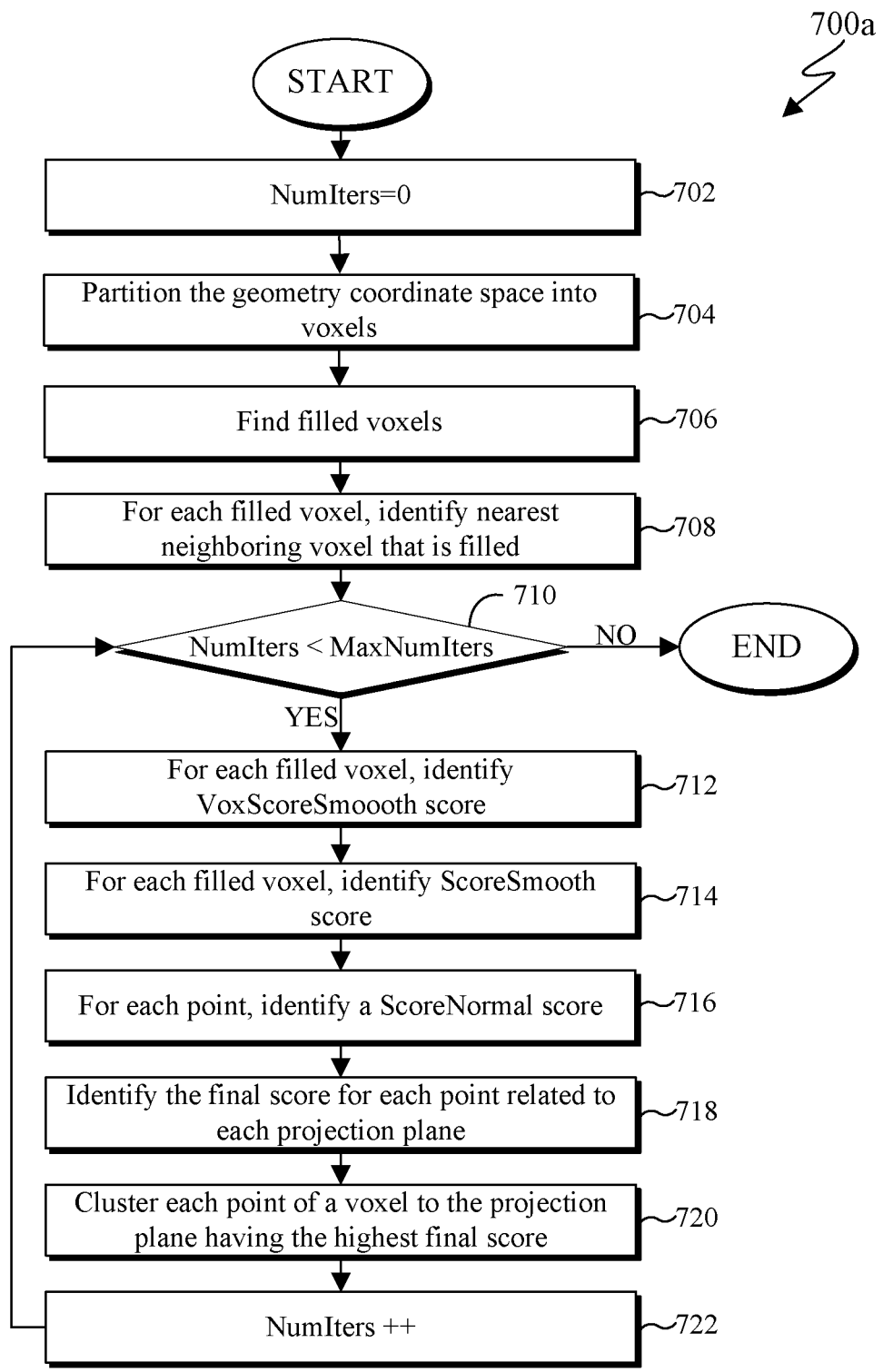
FIGS. 7A and 7B illustrate example flowcharts for calculating scores to smooth the partition of points of the point cloud into different patches using voxels in accordance with an embodiment of this disclosure.
Figure 7B:
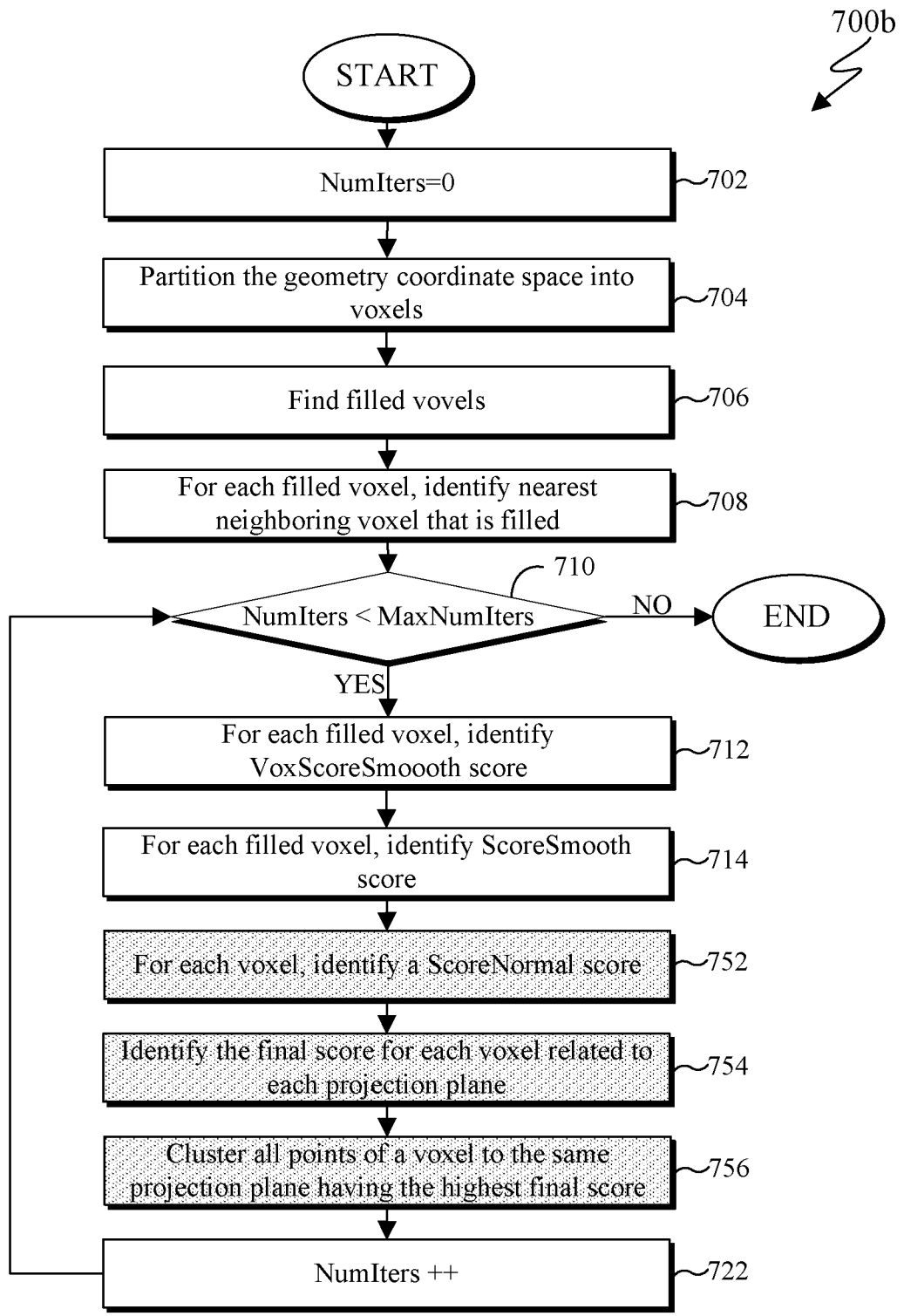

Based on the normal score of the points of the 3D point cloud 512 and the scoreSmooth of each voxel, the patch generator 514 can group the points of the 3D point cloud 512 to one of the projection planes. FIGS. 7A and 7B, below, describe in greater detail the refined smoothing of the patches identified during the initial segmentation.

```
Syntax                              (3)
partition = refineSegmentationGridBased ( geometry, kdTree, partition,
        normal, plane, numPoints, numPlanes, numNeighbors,
        numIters, lambda, voxelDimension )
{
    for (i = 0 to i < numPoints - 1) {
        // Find the corresponding voxel of each point.
        index = findVoxel( geometry[i] );
        // Record the indices of points inside each voxel.
        voxels[index].add( i );
    }
    // Remove empty voxels.
    voxels = getFilledVoxels( voxels );
    // Find the neighboring voxels of each voxel.
    neighbors = findNeighbors( voxels, kdTree );
    // perform repetition.
    for (n = 0 to numRepeatition - 1) {
        // Calculate voxScoreSmooth.
        for (i = 0 to size(voxels) - 1) {
            voxScoreSmooth[i][ ] = { 0 };
            // Iterate over number of points in each voxel,
            for (j = 0 to size(voxels[i])- 1) {
                voxScoreSmooth[partition[neighbors[i][j]]]++;
            }
        }
        // Calculate scoreSmooth for filled voxels.
        for (i = 0 to size(voxels) - 1) {
            for (j = 0 to size(neighbors[i]) - 1)
                for (k = 0 to numPlanes - 1) {
                    scoreSmooth[i][k] +=
                        voxScoreSmooth[neighbors[i][j]][k];
                }
            }
        }
    }
    // Calculate final score
    for (i = 0 to size(voxels) - 1) {
        numNeighbors = 0;
        for (j = 0 to size(neighbors[i]) - 1) {
            numNeighbors += size(neighbors[i][j]);
        }
        w = lambda / numNeighbors;
        for (j = 0 to size(voxels[i]) - 1) {
            bestScore = 0;
            for (k = 0 to numPlanes - 1) {
                scoreNormal = normal[voxels[i][j]] * plane[k];
                score = scoreNormal + w * scoreSmooth[j];
                if (score > bestScore) {
                    bestScore = score;
                    clusterIndex = j;
                }
            }
            partition[voxels[i][j]] = clusterIndex;
        }
    }
}
```

Syntax (3) above describes using voxels to refine (smooth) the initial segmentation process. The voxScoreSmooth is a score associated with each filled voxel. A voxScoreSmooth is identified for each voxel with respect to each of the projection planes. For example, if there are six projection planes, then the patch generator 514 identifies six voxScoreSmooth for a single voxel. To identify the voxScoreSmooth, the patch generator 514 counts all of the points within a voxel that correspond to each particular projection plane, based on the initial segmentation process. Each subsequent iteration (after the initial iteration), uses the updated partition values from the previous iteration. For example, the input to the first iteration is based on the output of the initial segmentation, then the input for the second iteration is based on the output of the first iteration, then the input for the third iteration is based on the output of the second iteration, and so on. That is, for each iteration the patch generator 514 counts the number of points in a voxel that corresponds to each projection plane based on the initial segmentation process (for the first iteration) or the previous iteration (for each subsequent iteration). By directly using the partition values as indices to enumerate the voxScoreSmooth value, the patch generator 514 removes the iteration over the number of projection planes to calculate voxScoreSmooth. In certain embodiments, the patch generator counts the percentage of points within each voxel that corresponds to each projection plane. It is noted that the syntax element voxScoreSmooth[partition[neighbors[i][j]]]++ indicates that the loops use the partition number as an index for voxScoreSmooth.

As described in Syntax (3) above, the patch generator 514 finds the corresponding voxel of each point. For example, the patch generator 514 identifies each point that is within each voxel. The patch generator 514 also identifies and removes any voxels that are empty. An empty voxel corresponds to a voxel that does not include any points of the 3D point cloud. The patch generator 514 also finds the neighboring voxels of each voxel. For example, the patch generator 514 can find the neighboring voxels of each voxel using a KD Tree. The patch generator 514 identifies and calculates the voxScoreSmooth as well as the scoreSmooth. Based on the voxScoreSmooth and the scoreSmooth, the patch generator 514 identifies and calculates the final score that is used to partition the points of the point cloud.

After the partition values are smoothed over the surface of point cloud, the patch generator 514 segments the points into patches, based on the projection plane associated with each point of the 3D point cloud 512. The frame packing 516 sorts and packs the patches (both the geometry and attribute patches) into respective frames, such that the geometry patches are packed into the geometry frames 518 and each of the different attribute patches are packed into the attribute frames 520. As illustrated in FIGS. 4B and 4C, the frame packing 516 organizes the geometry aspects and each of the different attribute aspects and places the patches within respective frames. The frame packing 516 also generates one or more occupancy map frames 522 based on the placement of the patches within the geometry frames 518 and the attribute frames 520.

The geometry frames 518 include pixels representing the geometry values of the 3D point cloud 512. The attribute frames 520 represents different attributes of the point cloud. For example, for one of the geometry frames 518 there can be one or more corresponding attribute frames 520. The attribute frame can include color (texture), normal, material properties, reflection, motion, and the like. In certain embodiments, one of the attribute frames 520 can include color values for each of the geometry points within one of the geometry frames 518, while another attribute frame can include reflectance values which indicate the level of reflectance of each corresponding geometry point within the same geometry frame 518. Each additional attribute frame 520 represents other attributes associated with a particular geometry frame 518. In certain embodiments, each geometry frame 518 has at least one corresponding attribute frame 520.

In certain embodiments, to generate one of the attribute frames 520 that represent color, the geometry frames 518 are compressed by one of the encoding engines 524 using a 2D video codec such as HEVC. The encoded geometry frame information is decoded and the geometry of the 3D point cloud is reconstructed. The reconstructed geometry coordinates are smoothed and color values are interpolated from the color values of the 3D point cloud 512. The generated colors are then segmented to match the same patches as the geometry information and packed, via the frame packing 516 into one of the attribute frames 520 that represent color.

The occupancy map frames 522 represent occupancy maps that indicate the valid pixels in the frames (such as the geometry frames 518 and the attribute frames 520). For example, the occupancy map frames 522 indicate whether each pixel in the geometry and attribute frames 518 and 520 is a valid pixel or an invalid pixel. The valid pixels correspond to pixels that represent points of the 3D point cloud 512. The invalid pixels are pixels within a frame that do not represent a point of the 3D point cloud 512. In certain embodiments, one of the occupancy map frames 522 can correspond to both a geometry frame 518 and an attribute frame 520.

For example, when the frame packing 516 generates the occupancy map frames 522, the occupancy map frames 522 include predefined values for each pixel, such as zero or one. When a pixel of the occupancy map at position (u, v) is a value of zero, indicates that the pixel at (u, v) in the geometry frame 518 and the attribute frame 520 are invalid. When a pixel of the occupancy map at position (u, v) is a value of one, indicates that the pixel at (u, v) in the geometry frame 518 and the attribute frame 520 are valid.

The encoding engines 524 encode the geometry frames 518, the attribute frames 520, and the occupancy map frames 522. In certain embodiments, a single encoding engine 524 encodes the frames (such as the geometry frames 518, the attribute frames 520, and the occupancy map frames 522). In other embodiments, the frames (such as the geometry frames 518, the attribute frames 520, and the occupancy map frames 522) are encoded by independent encoding engines 524. For example, one encoding engine 524 can encode the geometry frames 518, another encoding engine 524 can encode the attribute frames 520, and yet another encoding engine 524 can encode the occupancy map frames 522. In certain embodiments, the encoding engines 524 can be configured to support an 8-bit, a 10-bit, a 12-bit, a 14-bit, or a 16-bit precision of data. The encoding engine 524 can be a video or image codec such as HEVC, AVC, VP9, VP8, VVC, and the like to compress the 2D frames representing the 3D point cloud.

The geometry, attribute, and occupancy map frames 518, 520 and 522 can be encoded in a lossless manner or a lossy manner. It is noted that geometry, attribute, and occupancy map frames 518, 520 and 522 need not all be encoded in the same manner.

The multiplexer 526 combines the multiple frames (such as the geometry frames 518, the attribute frames 520, and the modified occupancy map frames 522) which are encoded, to create a bitstream 530.

FIG. 5C illustrates the decoder 550 that includes a demultiplexer 552, one or more decoding engines 560, and a reconstruction engine 562. The decoder 550 receives a bitstream 528, such as the bitstream that was generated by the encoder 510. The demultiplexer 552 separates bitstream 528 into one or more bitstreams representing the different frames. For example, the demultiplexer 552 separates various streams of data such as the geometry frame information 554 (corresponding to the encoded geometry frames 518 of FIG. 5B), attribute frame information 556 (corresponding to the encoded attribute frames 520 of FIG. 5B), and the occupancy map information 558 (corresponding to the occupancy map frames 522 of FIG. 5B).

The decoding engines 560 decode the geometry frame information 554 to generate the geometry frames. The decoding engines 560 decode the attribute frame information 556 to generate the attribute frames. Similarly, the decoding engines 560 decode the occupancy map information 558 to generate the occupancy map frames. In certain embodiments, a single decoding engine 560 decodes the geometry frame information 554, the attribute frame information 556, and the occupancy map information 558.

After the geometry frame information 554, the attribute frame information 556, and the occupancy map information 558 are decoded, the reconstruction engine 562 generates a reconstructed point cloud 564. The reconstruction engine 562 reconstructs the point cloud 564 based on the decoded geometry frame information 554, the decoded attribute frame information 556, and the decoded occupancy map information 558. The reconstructed point cloud 564 is similar to the 3D point cloud 512.

Although FIGS. 5A-5C illustrate one example of transmitting a point cloud various changes may be made to FIGS. 5A-5C. For example, additional components can be included in the encoder 510 and the decoder 550.

FIGS. 6A, 6B, 6C, and 6D illustrate example flowcharts 600a, 600b, 600c, and 600d, respectively, for calculating scores to smooth the partition of points of the point cloud into different patches in accordance with an embodiment of this disclosure. The flowcharts 600a, 600b, 600c, and 600d can be performed by the server 104 or any of the client devices 106-116 of FIG. 1, the server 200 of FIG. 2, the electronic device 300 of FIG. 3, the encoder 510 of FIGS. 5A and 5B, or any other suitable device or system. For ease of explanation, the flowcharts 600a, 600b, 600c, and 600d are described as being performed by the encoder 510 of FIGS. 5A and 5B.

The flowcharts 600b, 600c, and 600d describe portions of the flowchart 600a in greater detail. For example, the flowchart 600b describes the step 610 of flowchart 600a in greater detail. Similarly, the flowchart 600c describes the step 640 of flowchart 600a in greater detail. Additionally, the flowchart 600d describes the step 650 of flowchart 600a in greater detail.

In step 610, of FIG. 6A, the patch generator 514 performs the initial segmentation of a point cloud, such as the 3D point cloud 512 of FIG. 5B. The syntax (1), above, and FIG. 6B, below, describe the initial segmentation of the point cloud.

During the initial segmentation process of step 610, the patch generator 514 compares the angles of the normal vectors of the points, which are perpendicular to the surface of the point cloud to a normal vector of each projection plane. Based on the comparison, the patch generator 514 can assign a score that indicates how close the normal vector of a point is to each of the projection planes. The projection plane that has the largest score of a point is assigned by the patch generator 514, as the initial cluster index for that point. That is, the initial segmentation clusters each point of the point cloud to as particular projection plane based on the directional proximity of the normal vector of each point to the vectors of each projection plane.

In step 630, the patch generator 514 identifies the various inputs and sets various parameters in order to smooth the clustering of points over the surface of the point cloud. Some of the inputs needed to refine the patches are from the initial segmentation (of step 610) and can be reused when smoothing the patches. For example, several of the inputs used to refine the patches include, the geometry coordinates of the point cloud, the normal vectors of each point, the number of planes, the unit vectors of projected planes, the initial clustering indices estimated by the initial segmentation process, the geometric positioning of the projection planes, the number of the projection planes, and the like. The patch generator 514 can specify a KD-Tree data structure which can be used to find the neighboring points of each point. The patch generator 514 can limit the number of neighboring points (or neighboring voxels) from a particular point (or voxel) based on one or more predefined parameters, such as a distance or a maximum number of neighboring points. For example, the number of neighbors of each point can be identified based on the KD Tree, the point cloud itself and the predefined number of neighboring points. The patch generator 514 can also use a constant to control the level of smoothness. The constant is denoted as lambda (k). Additionally, the patch generator 514 can set the number of iterations to perform the smoothing of the patches.

In steps 640 and 650, the patch generator 514 generates the refined patches. The syntax (2), above, and FIGS. 6C and 6D, below, describe the process of refining the patches of the initial segmentation. The steps 640 and 650 smooth the patches generated in step 610 since the patches as generated in 610 are often jagged and scattered. For example, during step 610, neighboring points can be assigned to different projection planes, which can result in patches that appear to be sharp or result in the creation of many small scattered patches. Scattered small patches that are not smooth when stored in a 2D frame can increase the bitrate during when the frames are encoded. As such, the steps 640 and 650 smooth the clustering of points over the surface of the point cloud after the initial segmentation process of step 610. Step 640 identifies the scoreSmooth values of all of the points over a number of repetitions (iterations). After identifying the scoreSmooth for each point and each neighboring point, in step 650 the overall score for each point is identified.

In step 670, the patch generator 514 outputs the smoothed partitions after identifying the scoreSmooth values and the overall score over a number of iterations. The points can then be projected to their assigned projection plane and information representing the point can be stored in the geometry frames 518.

The flowchart 600b describes the process of performing the initial segmentation of a point cloud. In step 611, the patch generator 514 identifies certain inputs such as the point cloud that is to be segmented into patches, and the number and location of the planes to which the point cloud is to be projected onto. The patch generator 514 can also identify a unit vector for each of the projected planes to which the point cloud is to be projected onto.

The positions of the projection planes are located external to the surface of the point cloud. The encoder 510 can set the number and the locations of the projection planes. For example, the number of the projection planes can be predefined by the encoder 510 or the patch generator 514. The number of projection planes can be set based on the size of the point cloud, the shape of the point cloud, or both size and shape of the point cloud. As shown in FIG. 4D, there are six projection planes, while other embodiments can include more or less projection planes of differing sizes, shapes and angles.

In step 612, the patch generator 514 sets the expression numPoints to the size of the point cloud. That is, the expression numPoints corresponds to the number of points in the point cloud. The patch generator 514 also sets the value of the variable i to zero.

In step 613, the patch generator 514 compares the value of the variable i to the number of points within the point cloud. That is, when the value of i is greater than or equal to the number of points of the point cloud, then in step 621, the patch generator 514 outputs the partitions. The partitions represent the initial segments that are generated during the initial segmentation process. When the value of i is less than the number of points of the point cloud, then in step 614 the patch generator 514 sets the expression bestScore to zero and the value of the variable j to zero. The decision of step 613 is repeated until all of the points in the point cloud are scored.

In step 615, the patch generator 514 compares the value of the variable j to the number of planes. On the first iteration, the value of j is zero (as set in step 614), and each subsequent iteration the value of j increases by one per step 619. When the value of the variable j is less than the number of planes then the patch generator 514 in step 616, the patch generator 514 sets the score based on the normal vector of plane j and the normal vector of a point whose index corresponds to the value of the variable i. Thereafter, in step 617 the patch generator 514 compares the score of point i (the score of the point that corresponds to the value of the variable i) to the expression bestScore. On the first iteration, the value of bestScore is zero (as set in step 614).

If the expression score (representing the comparison of the normal vector of point represented by the variable i with respect to the normal vector of the projection plane represented by the variable j) is greater than the expression bestScore, then in step 618, the expression bestScore is set to score and the projection plane corresponding to the value of the variable j is set as the projection plane for the point represented by the variable i. Thereafter, the value of j is increased by one in step 619. If in step 617, the expression score (representing the comparison of the normal vector of point represented by the variable i with respect to the normal vector of the projection plane represented by the variable j) is less than or equal to the expression bestScore, then in step 619, the value of j is increased by one.

After the value of j is increased by one in step 619, the patch generator 514 in step 615 determines whether the value of j is less than the number of planes. The steps 616, 617, 618, and 619 are repeated in order to identify the projection plane that has the largest score with respect to the point represented by the value of the variable i. For example, in step 616 the point whose index corresponds to the value of the variable i is compared to the first projection plane to generate a score. The score is compared to the bestScore in step 617. When the score is less than or equal to the bestScore the next projection plane is compared to the point whose index corresponds to the value of the variable i in step 615. However if the score is greater than the best score, then that projection plane is identified as the current cluster index for point whose index corresponds to the value of the variable i (in step 618) and the value of j is increased such that the next projection plane is compared to the point whose index corresponds to the value of the variable i in step 615. This process continues for all of the projection planes. For example, if there are six projection planes, the patch generator 514 performs the steps 615, 616, 617, and 619 (and sometimes 618) six times for the point whose index corresponds to the value of the variable i.

Returning back to step 615, when the value of j is greater than or equal to the number of planes, the patch generator 514 in step 620 sets a partition for the point whose index corresponds to the value of the variable i. The patch generator also increases the value of the variable i by one, in step 620 That is, after the normal vectors of each projection plane has been compared to the normal vector of point whose index corresponds to the value of the variable i (and a particular projection plane is identified as having the best score), the patch generator 514 sets a partition of point whose index corresponds to the value of the variable i to the projection plane with the best score (in step 620). Thereafter, the value of the variable i is increased by one. That is, steps 613 through step 619 were performed with respect to a particular point of the point cloud. Once a particular projection plane is identified for the particular point with a value i, the patch generator 514 identifies the projection plane for the next point (i+1).

After the value of the variable i is increased by one, the patch generator 514 at step 614 re-compares the value of the variable i to the number of points within the point cloud. If the value of the variable i is less than the number of points within the point cloud, indicates that one or more points of the point cloud do not yet have a projection plane assigned to them. If the value of variable i is equal to or greater than the number of points in the point cloud, then all of the points have a projection plane assigned to them. Once all of the points of the point cloud are assigned a projection plane, then in step 621, the patch generator 514 outputs the partitions. The output partitions represent the projection plane that each point is assigned.

The flowcharts 600*c* and 600*d* describe the process of refining the initial segmentation of a point cloud (which was described in FIG. 600*b*). As described above in step 630 of FIG. 6A, the patch generator 514 identifies certain inputs to smooth the initially segmented patches such as the point cloud, and the partitions that were output in step 621. The patch generator 514 can identify and reuse certain inputs from the step 611 such as the number planes, the location of the planes to which the point cloud is to be projected onto. The patch generator 514 can also identify the KD-tree data structure that is used to find the nearest neighboring points of each point of the point cloud. The encoder 510 can also set parameters associated with the number of neighboring points. For example, the encoder 510 can also set a maximum number of neighboring points of each point. Additionally, or alternatively, the encoder 510 can set a distance that points must be within in order to qualify as a neighboring point.

Figure 6C:
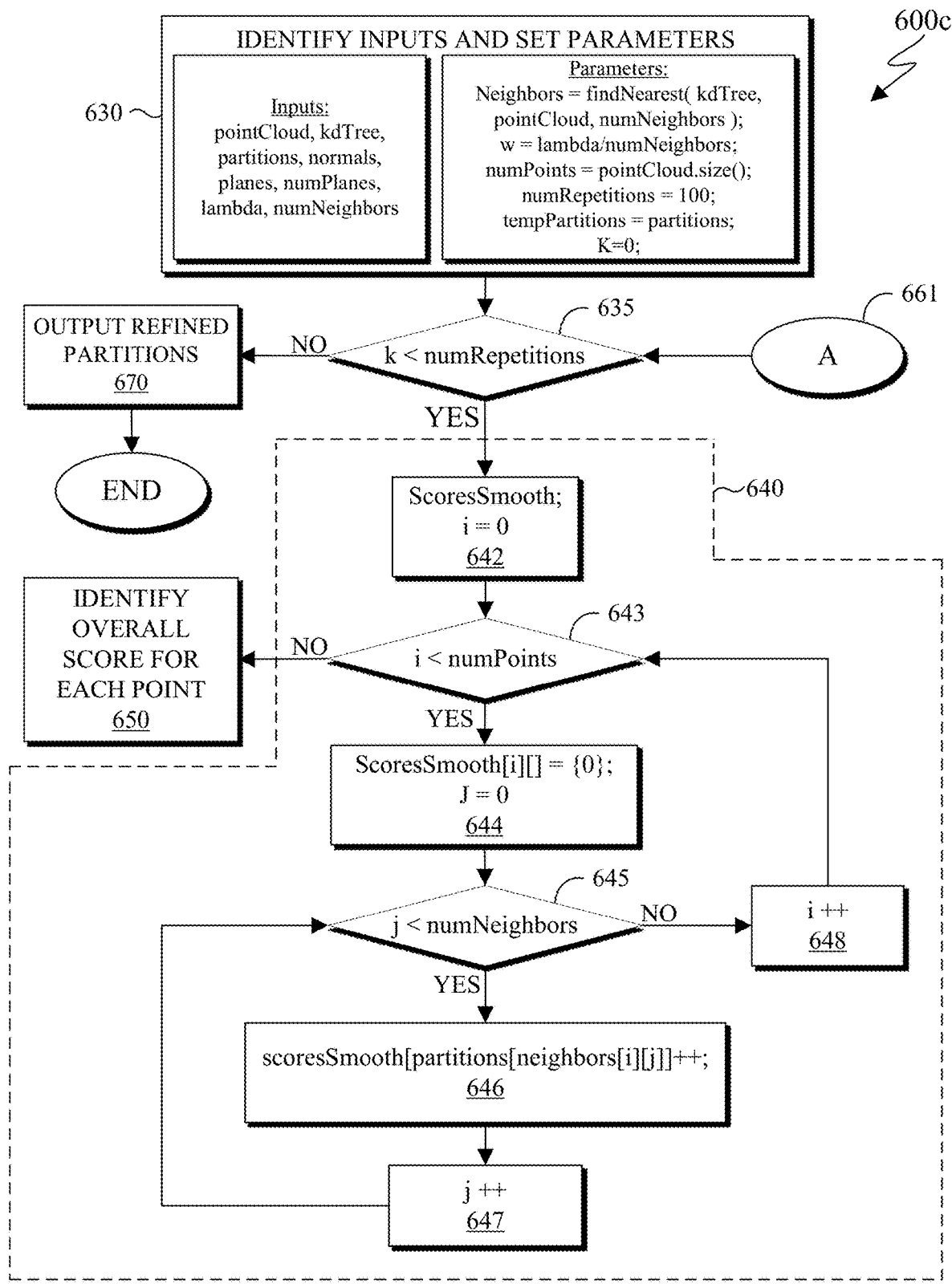
Figure 6D:
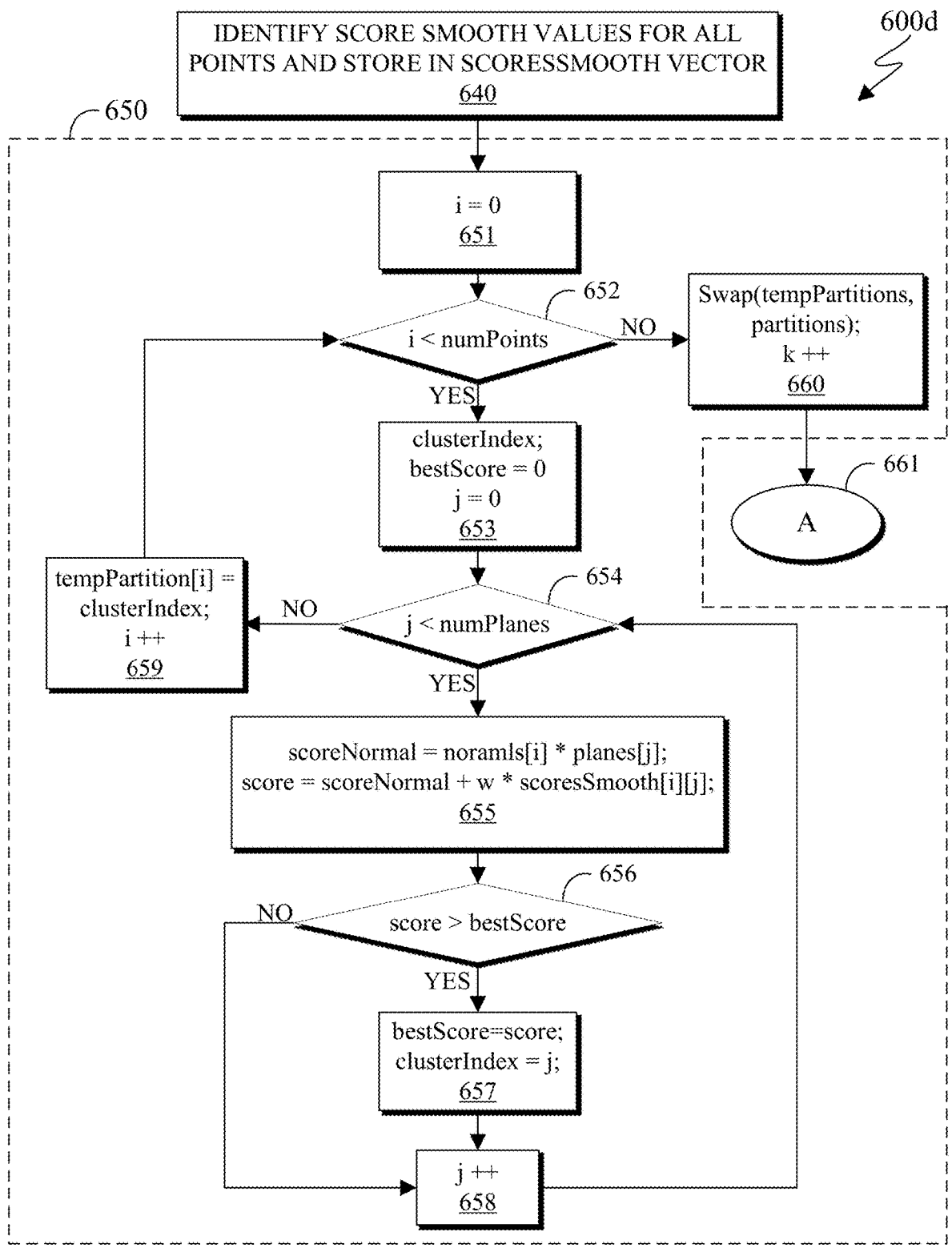

Additionally, in step 630, the patch generator 514 can set certain parameters and expressions. For example, the expression w is the constant lambda ($\lambda$) divided by the expression numNeighbors. The division over the number of nearest neighbors in the weight parameter normalizes scoreSmooth between 0 and 1. The patch generator 514 can set the expression numPoints to pointCloud.size, such that the value associated with the expression numPoints corresponds to the number of points of the point cloud to be segmented. The patch generator 514 can set the expression tempPartitions to partitions and the value of the variable k to zero. Additionally, the patch generator 514 can set the expression numRepetitions to a predefined value. The expression numRepetitions indicates the number of times that the process described in FIGS. 6C and 6D is repeated. Performing the process described in FIGS. 6C and 6D over multiple iterations increases the smoothing of the segments that are used when projecting the points of the point cloud onto 2D surfaces, such as a geometry frame 518 of FIG. 5B. For example, after each iteration the points can be projected to different patches, based on neighboring points which will further smooth the segmentation. In certain embodiments, the expression numRepetitions can be set to a value of 100. It is noted that the variables and expressions can be set to different values, and the values provided above and in the FIGURES are examples.

In step 635, the patch generator 514 compares the value of k to the expression numRepetitions. As described above during the initial iteration, the patch generator 514 can set the variable k to a value of zero and the expression numRepetitions to a predefined value, such as 100. As such, during the initial iteration, since the variable k is less than the expression numRepetitions, the process continues with step 642.

When the value of k is less than the expression numRepetitions, then in step 642 the patch generator 514 establishes an expression scoreSmooth and sets the value of the variable i to zero. When the value of the variable k is greater than or equal to the expression numRepetitions, then in step 670, the patch generator 514 outputs the refined partitions. The refined partitions represent the smoothed patches since certain points are assigned a different projection plane than they were initially assigned in step 610.

In step 643, the patch generator 514 compares the value of the variable i to the expression numPoints. The expression numPoints corresponds the number of points within the point cloud. On the first iteration, the value of the variable i is zero (as set in step 642), and each subsequent iteration the value of the variable i increases by one per step 648. It is noted that the step 643 is similar to the step 613.

When the value of the variable i is greater than or equal to the number of points of the point cloud, the patch generator 514 identifies the overall score for each point in step 650. When the value of the variable i is less than the number of points of the point cloud, then in step 644, the patch generator 514 sets the variable j to a value of zero and sets the expression scoresSmooth for a point whose index corresponds to the value of the variable i.

In step 645, the patch generator 514 compares the value of the variable j to the expression numNeighbors. On the first iteration, the value of the variable j is zero (as set in step 644), and each subsequent iteration the value of the variable j increases per step 658. The expression numNeighbors corresponds the maximum number of neighbors associated with each point of the point cloud.

When the value of the variable j is greater than the expression numNeighbors, then in step 648, the patch generator 514 increases the value of the variable i. When the value of the variable j is less than the expression numNeighbors the patch generator 514 identifies a scoresSmooth for the different projection planes, since the partition values are integers between 0 and numPlanes−1 (one less than the value of the expression numPlanes). That is, in step 646, the patch generator 514 compares the partition values of each point whose index corresponds to the value of the variable i and its neighboring points. For example, the scoresSmooth compares the partitions of the associated with the point represented by the variable i to the neighboring point represented by the variable j. The scoresSmooth for the point represented by the variable i indicates the number of neighboring points that share the same projection plane.

After the value of the variable j is increased, in step 647, the patch generator 514 returns to step 645 to determine whether the new value of the variable j is less than the expression numNeighbors. The patch generator 514 continues comparing the projection plane (as identified in step 621) of the point represented by the value of the variable i with the projection plane of that point which is represented by the value of the variable j. When the value of j is increased in step 647 to a value that is larger than the expression numNeighbors, indicates that the maximum number of nearest neighbors of the particular point is reached. As such, the value of the variable i is increased in step 648. When the value of the variable i is increased, indicates that the variable i represents a new point of the point cloud, such that the step 646 compares the projection plane of the new point (as identified in step 621) to the projection plane of the neighboring points of the new point.

As described above, the patch generator 514 determines whether the value of the variable i is larger than or equal to the number of points in the point cloud. When the value of the variable i is larger than or equal to the number of points in the point cloud, the process continues at step 650. The flowchart 600*d* describes the step 650.

In step 651, of FIG. 6D, the patch generator 514 sets the value of the variable i to zero. In step 652, the patch generator 514 compares the value of the variable i to the value of the expression numPoints. It is noted that step 652 is similar to the steps 613 and 643. When the value of the variable i is less than the number of points of the point cloud, then the patch generator 514 identifies the clusterIndex from the flowchart 600*b* of FIG. 6B, sets the expression bestScore to zero, and the variable j to zero.

In step 654, the patch generator 514 compares the variable j to the expression numPlanes. It is noted that step 654 is similar to the step 615. On the first iteration, the value of the variable j is zero (as set in step 653), and each subsequent iteration the value of the variable j increases per step 658. When the value of the variable j is less than the number of planes then the patch generator 514, in step 616, the scoreNormal and the score in step 655. The scoreNormal compares the normal vector of the point corresponding to the variable i to the normal vector of the projection plane corresponding to the variable j. It is noted that the expression scoreNormal is similar to the expression score of step 616 of FIG. 6B. The score is the scoreNormal plus the variable w times the scoresSmooth of the point corresponding to the variable i and the projection plane corresponding to the variable j, as identified in step 620 of FIG. 6B.

In step 656, the patch generator 514 compares the score (identified in step 655) to the expression bestScore. It is noted that step 656 is similar to the step 617, however the expression score represents different values. On the first iteration, the value of bestScore is zero (as set in step 653).

When the expression score is greater than the expression bestScore, the patch generator 514 in step 657 sets the expression bestScore to score, and sets the clusterIndex to the value of the variable j. Thereafter the patch generator 514, in step 658, increases the value of the variable j.

When the expression score is less than or equal to than the expression bestScore, the patch generator 514 in step 658 increases the value of the variable j. After the value of the variable j is increased in step 658, the patch generator 514 in step 654 again determines whether the value of the variable j is less than the number of planes. The steps 655, 656, and 658 are repeated in order to identify whether the projection plane represented by the variable j has the largest score with respect to the point represented by the value of the variable i. Once the variable j is equal to or larger than the expression numPlanes, indicates that a particular projection plane (identified by the expression clusterIndex in step 657) is identified for the point represented by the value of the variable i. As such, in step 659, the patch generator 514 sets the expression clusterIndex for the point represented by the value of the variable i to the expression tempPartition[i]. The patch generator 514 also increases the value of the variable i in step 659.

After the value of the variable i is increased in step 658, the patch generator 514 again determines in step 652 whether the value of the variable i is greater than or equal to the expression numPoints. When the value of the variable i is greater than or equal to the expression numPoints, the patch generator 514 in step 660 stores the tempPartition (which indicates the projection plane that is used to segment the point cloud based on the scoreNormal and the scoresSmooth) with the expression partition, which was the output of step 621 of FIG. 6B. Additionally, in step 660, the patch generator 514 also increases the value of the variable k.

After increasing the value of the variable k, at step 660, the process returns to the flowchart 600*c* of FIG. 6C at block 661. As such, at step 635, the patch generator 514 compares the variable of the variable k to the expression numRepetitions. When the value of the variable k is less than the predefined number of iterations, the process of FIGS. 6C and 6D is repeated to further smooth the segments. When the value of the variable k is greater than or equal to the expression numRepetitions, then in step 670, the patch generator 514 outputs the refined partitions. After outputting the refined partitions, the points can be projected and packed into a 2D frame representing geometry of the point cloud.

Although FIGS. 6A, 6B, 6C, and 6D illustrate one example of a segmenting a point cloud into patches various changes may be made to FIGS. 6A, 6B, 6C, and 6D. For example, while shown as a series of steps, various steps in FIGS. 6A, 6B, 6C, and 6D could overlap, occur in parallel, or occur any number of times.

FIGS. 7A and 7B illustrate example flowcharts 700a and 700b for calculating scores to smooth the partition of points of the point cloud into different patches using voxels in accordance with an embodiment of this disclosure. In particular, the flowcharts 700a and 700b describe the refining process for smoothing points after the patch generator 514 initially segments the points of the point cloud, as described in FIGS. 6A and 6B, and Syntax (1), above. In certain embodiments, the flowcharts 700a and 700b are performed instead of the flowcharts 600c and 600d of FIGS. 6C and 6D, respectively. In certain embodiments, the flowcharts 700a and 700b are performed in addition to the flowcharts 600c and 600d of FIGS. 6C and 6D, respectively.

The flowcharts 700a and 700b can be performed by the server 104 or any of the client devices 106-116 of FIG. 1, the server 200 of FIG. 2, the electronic device 300 of FIG. 3, the encoder 510 of FIGS. 5A and 5B, or any other suitable device or system. For ease of explanation, the flowcharts 700a and 700b are described as being performed by the encoder 510 of FIGS. 5A and 5B.

After initially segmenting the points of the point cloud (such as the 3D point cloud 512), the patch generator 514 sets the value of the variable numInters to zero (step 702). In step 704, the patch generator 514 partitions the geometry coordinate space into voxels. For example, the patch generator 514 creates a grid over the area of the point cloud(s) and each cell of the grid is denoted as a voxel. In certain embodiment, the size of each voxel is uniform over the area that includes the point cloud(s). The patch generator 514 can set the size of the voxels. As described above in FIG. 4D, the point cloud 474 and the point cloud 476 within an area that is partitioned into multiple voxels 472.

In step 706, the patch generator 514 identifies the voxels that include at least one point of a point cloud. In certain embodiments, the patch generator 514 can generate an index that identifies the points of the point cloud that are within each voxel. For example, the index can specify that the $5^{th}$ point, the $40^{th}$ point, and the $10,200^{th}$ point of the point cloud are within the $100^{th}$ voxel. A filed voxels is a voxel that that include at least one point of the point cloud.

In step 708, the patch generator 514 identifies the nearest neighboring voxels of each filled voxel. The nearest neighboring voxels (that include at least one point of the 3D point cloud) of a voxel are denoted as nnFilledVoxels (or neighbors in syntax (3)). The patch generator 514 identifies the nnFilledVoxels using a KD-Tree partitioning. In certain embodiments, the number of nnFilledVoxels of a single voxel are limited based on the search radius from a voxel, a maximum number of neighboring voxels, a predefined quantity of points inside the neighboring voxels, or a combination thereof.

In step 710, the patch generator 514 compares the value of numIters to a predefined parameter, maxNumIters. As discussed above, in step 702, numIters was initially set to zero. The predefined parameter, maxNumIters, indicates the number of iterations that the smoothing is performed and can be set by the encoder 510.

That is, when the value of numIters is greater than or equal to number represented by maxNumIters, the initially segmented partitions are considered to be smoothed (refined). When initially segmented partitions are considered to be smoothed, the point cloud is projected to form the patches based on the partitions and the patches are stored in the frames (such as the geometry frame 518). To generate the patches, each point of the point cloud is projected to a particular projection plane.

When the value of numIters is less than the number represented by maxNumIters, the patch generator 514 performs another iteration of smoothing. On the first iteration, the value of the variable numInters is zero (as set in step 702), and each subsequent iteration the value of variable numInters increases in step 722.

It is noted that the value of the parameter maxNumIters is smaller than the expression numRepetitions of FIG. 6C. For example, as described above, the expression numRepetitions (of FIG. 6C) can specify that 100 iterations are used smooth the initially segmented patches (of FIGS. 6A and 6B), while the parameter maxNumIters (of FIG. 7A) can specify that 10 iterations are used to smooth the initially segmented patches (of FIGS. 6A and 6B).

In step 712, the patch generator 514 identifies a voxScoreSmooth for each voxel. Equation (1) below describes the voxScoreSmooth. A voxScoreSmooth is identified for each filled voxel with respect to each of the projection planes. For example, if there are six projection planes, then the patch generator 514 identifies up to six voxScoreSmooth for a single voxel that includes at least one point. To identify the voxScoreSmooth, the patch generator 514 counts all of the points within a voxel that correspond to each particular projection plane, based on the initial segmentation process. That is, the patch generator 514 counts each point in a voxel that corresponds to each projection plane based on the initial segmentation process.

$$\text{voxScoreSmooth}[v][p] = \text{number of points in voxel } v \text{ having partition } p \quad \text{Equation (1)}$$

In step 714, the patch generator 514 identifies a scoreSmooth value for each filled voxel. Equation (2), below, describes scoreSmooth value for a particular voxel (and its neighboring voxels) with respect to a particular projection plane. To identify the scoreSmooth value for a filled voxel, the patch generator 514 adds up the voxScoreSmooth values of a particular voxel and it's neighboring filled voxels (assuming each voxel is found as a neighboring voxel of itself by KD Tree). In Equation (2), below, the variable p identifies the index number of a particular projection plane. Similarly, the variable v of Equation (2) identifies the index number of a filled voxel that includes a particular point, identified by the variable i. For example, the variable v corresponds to the index of a voxel that includes the i-th point. As such, the value of scoreSmooth is the same for all of the points within a particular filled voxel.

$$\text{scoreSmoth}[v][p] = \Sigma_{j=1}^{size(nnFilledVoxels[v])} \text{voxScoreSmooth}[j][p] \quad \text{Equation (2)}$$

That is, one scoreSmooth value or score is derived for the group of points inside each voxel. For example, the voxScoreSmooth score is computed for each filled voxel (step 712) and then the final scoreSmooth score is calculated by merely adding up the voxScoreSmooth of neighboring voxels (which were identified in step 708), such that the patch generator 514 identifies only one scoreSmooth score for the points inside each voxel.

In step 716, the patch generator 514 identifies a scoreNormal value for each point of the point cloud. The scoreNormal relates each point to each projection plane. Equation (3), below, relates a particular point, denoted by the variable i, to each projection plane. In Equation (3) normal[i] specifies the normal vector of the i-th point orientation[p] specifies the vector of the p-th projection plane.

$$\text{scoreNormal}[i][p] = \text{normal}[i] \times \text{orientation}[p] \quad \text{Equation (3)}$$

In step 718, the patch generator 514 identifies a final score for each point that is related to each projection plane. Equation (4), below, describes the final score. That is, the patch generator 514 identifies the final score for each point, denoted by variable i, and each projection plane, denoted as variable p. For example, the final score is the linear combination of the scoreNormal of a particular point with respect to a particular projection plane and the scoreSmooth, where the scoreSmooth is scaled by the smoothing constant lambda (λ) over the total number of points inside the neighboring filled voxels of each filled voxel v, which normalizes the scoreSmooth between 0 and 1.

Equation $$\text{Score}[i][p] = \text{scoreNormal}[i][p] + \left( \frac{\lambda}{\sum_j \text{size}(\text{nnFilledVoxels}[v][j])} \times \text{scoreSmooth}[v][p] \right) \quad (4)$$

In step 720, the patch generator 514 clusters each point of a voxel to the projection plane having the highest final score, as identified in Equation (4), above. Equation (5), below describes the clustering of the points to a particular projection plane, based on the final score. That is, each point is assigned one of the projection planes that the point is to be projected to depending on which projection plane has the highest final score.

$$\text{partition}[i] = p, \text{ if score}[i][p] \text{ is max among all } p \quad \text{Equation (4)}$$

After each point is assigned to a particular projection plane, the patch generator 514 increases the value of the variable numInters (step 722). After the variable numInters is increased, the variable numInters is compared to the parameter maxNumIters. If the variable numInters larger than or equal to the parameter maxNumIters, the points of the point cloud can be projected to their assigned projection planes. If the variable numInters less than the parameter maxNumIters, then the patch generator 514 repartitions the geometry coordinate space into multiple voxels. In certain embodiments, the size and shape of the voxels can change from iteration to iteration. In certain embodiments, the size and shape of the voxels remain constant through each iteration. The patch generator 514 performs steps 710 through 722 until the variable numInters larger than or equal to the parameter maxNumIters.

The flowchart 700b of FIG. 7B describes another method for smoothing the initially segmented projections (described above in Syntax (1) as well as FIGS. 6A and 6B). It is noted that portions of the flowchart 700a are repeated in the flowchart 700b. In particular steps 702-714 and 722 of FIG. 7A are the same in FIG. 7B. Since portions of the flowchart 700a are repeated in the flowchart 700b, the descriptions of those steps with respect to the flowchart 700b are not repeated.

In step 752 of FIG. 7B, the patch generator 514 identifies a scoreNormal score for each voxel. The scoreNormal relates each voxel to each projection plane. The scoreNormal for each voxel can be based on the centroid of points within a voxel or the center point within a voxel.

When the scoreNormal for each voxel is based on the centroid of points within a voxel, the patch generator 514 first identifies the centroid of points within each voxel and then identifies the normal vector of the centroid. The normal vector of the centroid is a weighted linear combination of the normal vectors of the points within a single voxel. The scoreNormal can be based on the centroid of points within a voxel, where the centroid is a weighted combination of the normal vectors of the points within the voxel. For example, the patch generator 514 identifies the scoreNormal of a voxel by first identifying the normal vectors of each point within the voxel, and then identifying the normal vector for the centroid of the voxel as the weighted average of all the normal vectors in the voxel.

Equation (6) below, describe identifying the weight of a point for identifying scoreNormal for the centroid of the voxel. In particular, Equation (6) describes identifying the weight for a point denoted by the variable i inside a single voxel. In Equation (6), the variable $d_i$ is the distance from the i-th point inside the v-th voxel to the centroid. The variable $v_n$ is the number of points inside the voxel. Equation (7), below describes using identifying the scoreNormal for the centroid of the voxel or the center point of the voxel.

Equation $$\text{weight}_{\text{centeroid}}[i] = \frac{\frac{1}{d_i}}{\sum_{j=1}^{n_v} \frac{1}{d_j}} \quad (6)$$

Equation $$\text{ScoreNormal}[v][p] = \text{normal}[v] \times \text{orientation}[p] \quad (7)$$

When the scoreNormal for each voxel is based on the center point within a voxel, the patch generator 514 identifies the normal vector for the center point of the voxel as a weighted linear combination of the normal vectors of the points inside the voxel. The scoreNormal can be based on the normal vector for the center point of the voxel, where the center point is a weighted combination of the normal vectors of each point within the voxel. For example, the patch generator identifies the scoreNormal of a voxel by first identifying the normal vectors of each point within a voxel and then identifying the normal vector for the center point of the voxel as the weighted average of all of the normal vectors within the voxel.

Equation (8) below, describe identifying the weight of a point for identifying scoreNormal for the center point of the voxel. In particular, Equation (8) describes identifying the weight for a point denoted by the variable i inside a single voxel. In Equation (8), the variable $d_i$ is the distance from the i-th point inside the v-th voxel to the center of the voxel. The variable $v_n$ is the number of points inside the voxel. Equation (7), below describes identifying the scoreNormal value for the center point of the voxel or the center point of the voxel.

Equation $$\text{weight}_{\text{center point}}[i] = \frac{\frac{1}{d_i}}{\sum_{j=1}^{n_v} \frac{1}{d_j}} \quad (8)$$

Equation

-continued $$ScoreNormal[v][p] = \text{normal}[v] \times \text{orientation}[p] \qquad (9)$$

In step 754, the patch generator 514 identifies a final score for each voxel that is related to each projection plane. The final score for each voxel is the linear combination of the scoreNormal of each voxel with respect to a particular projection plane and the scoreSmooth, where the scoreSmooth is modified by the smoothing constant, lambda (k). It is noted that step 718, described above, identifies the final score for each point, while in step 754, the patch generator 514 identifies final scores for each voxel. Identifying the final scores for each voxel, uses less processing power when there are fewer voxels than points of the point cloud.

In step 756, the patch generator 514 clusters all of the points inside a voxel to the same projection plane that has the highest final score. That is, each point in a voxel is assigned to the same projection plane. The points within different voxels can still be assigned to different projection planes.

Although FIGS. 7A and 7B illustrates one example of a point cloud encoding various changes may be made to FIGS. 7A and 7B. For example, while shown as a series of steps, various steps in FIGS. 7A and 7B could overlap, occur in parallel, or occur any number of times.

Figure 8:
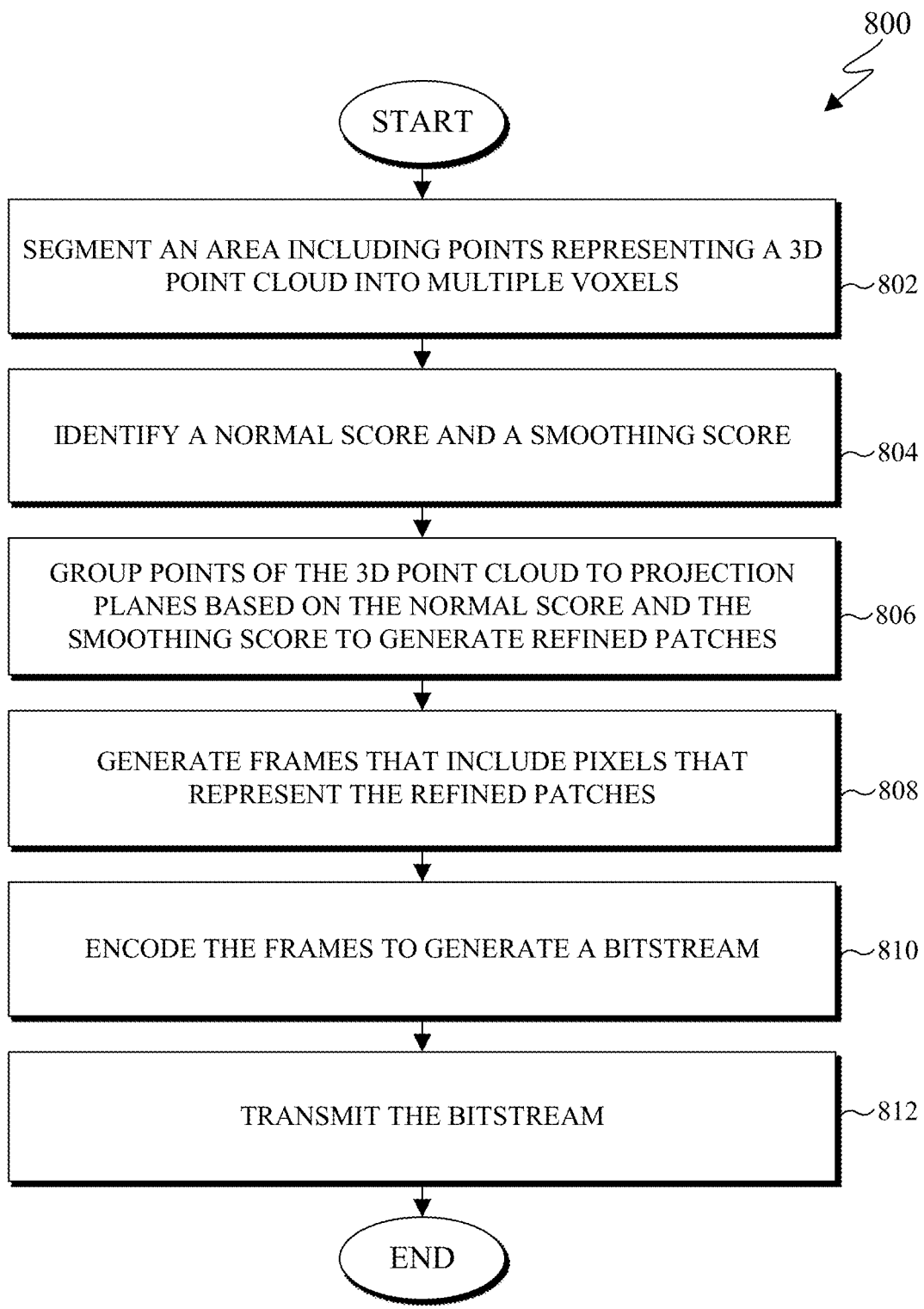
FIG. 8 illustrates example method for encoding a point cloud in accordance with an embodiment of this disclosure.

FIG. 8 illustrates example method 800 for encoding a point cloud in accordance with an embodiment of this disclosure. The method 700 can be performed by the server 104 or any of the client devices 106-116 of FIG. 1, the server 200 of FIG. 2, the electronic device 300 of FIG. 3, the encoder 510 of FIGS. 5A and 5B, or any other suitable device or system. For ease of explanation, the method 800 is described as being performed by the encoder 510 of FIGS. 5A and 5B.

In step 802, the encoder 510 segments an area including points of the point cloud into multiple voxels. For example, after the point cloud is initially segmented, the encoder 510 can partition the area surrounding a point cloud into a grid where each cell of the grid corresponds to a single voxel.

The points are initially segmented by identifying the normal vector of each point and comparing the angle of each normal vector to the normal vectors of each projection plane. A particular projection plane is initially assigned as the projection plane for a point when the angle of the normal vector of that projection plane that is the closest to the angle of the normal vector of a particular point.

In step 804 the encoder 510 identifies a normal score associated with each point of the point cloud and a smoothing score for each voxel that includes at least one point of the point cloud. For example, prior to identifying the smoothing score, for a voxel, the encoder 510 can identify each voxel that includes at least one point of the point cloud. The encoder can generate an index that assigns an index number to each voxel and associates an index number of each point that is included in each voxel.

To identify the normal score for each point, the encoder 510 identifies a normal vector of each point of the point cloud, where the normal vector is perpendicular to the eternal surface of the point cloud. The normal vector of each point is then compared to the normal vector of each projection plane. In certain embodiments, the normal score is identified and used during the initial segmentation process and can be reused during the smoothing process.

To identify the smooth score for each voxel, the encoder 510 first identifies a set of smoothing scores for each voxel. The set of smoothing scores for a single voxel indicates the number of points within each voxel that are assigned to each projection plane based on the initial segmentation. To identify the smoothing score of one voxel, the encoder 510 adds the points associated with each individual projection plane within a voxel and each of its identified neighboring voxels.

To identify neighboring voxels, the encoder 510 identifies one or more voxels (that include points of the point cloud) that neighbor each voxel. The encoder 510 can use a KD tree data structure to find the nearest neighboring voxels of each voxel. In certain embodiments, the number of nearest neighboring voxels to a single voxel can be limited based on a distance. For example, if the distance between a first voxel and a second voxel exceed a predefined distance, then the second voxel cannot be identified as a nearest neighboring voxel of the first voxel. In certain embodiments, the number of nearest neighboring voxels to a single voxel can be limited based on a predefined number of voxels. For example, a single voxel can have a limited number of neighboring voxels. In certain embodiments, the number of nearest neighboring voxels to a single voxel can be limited based on a predefined number of points inside a neighboring voxels.

In step 806, the encoder 510 groups the points of the 3D point cloud to one of the multiple projection planes based on the normal score of a point and the smoothing score of the voxel that the point is within. For example, after the normal score for each point and the smooth score for each voxel is identified, the encoder 510 identifies the final score for the points of the 3D point cloud. The final score relates each point to a particular projection plane based on the linear combination of the normal score of a point and the smooth score of the voxel, which that point is within. A smoothing constant can be applied to the smooth score. The final score identifies a particular projection plane that the point is to be projected to.

After the final score for each point of the point cloud is identified, the encoder 510 can determine whether to perform additional iterations of the smoothing. In certain embodiments, the encoder can determine whether to perform additional iterations of the smoothing based on a predefined parameter, which indicates a number of iterations that the smoothing is to be performed. If the encoder 510 determines to perform additional iterations of the smoothing, the encoder 510 re-segment the area (step 802) that includes the point cloud and identifies the normal score of each point and the smooth score of each voxel (step 804).

After determining that no additional iterations of smoothing are to be performed, in step 808, the encoder 510 projects each point onto its assigned projection plane and generates a 2D frame that represents the geometric position of the points of the 3D point cloud. Each cluster of points that is projected to a projection plane appears as a patch on the 2D frame. The encoder 510 can also create one or more attribute frames that represent aspects of the point cloud such as color, reflectance, material, and the like. In step 810, the encoder 510 encodes the one or more geometry frame, the one or more attribute frame(s) and any other generated frames that represent the 3D point cloud. After the frames representing 3D point cloud are encoded, the encoder 510 can multiplex the frames into a bitstream. In step 812, the encoder 510 transmits the bitstream. The bitstream can be ultimately transmitted to a decoder, such as the decoder 550.

Although FIG. 8 illustrates one example of a point cloud encoding various changes may be made to FIG. 8. For example, while shown as a series of steps, various steps in FIG. 8 could overlap, occur in parallel, or occur any number of times.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An encoding device for point cloud encoding, the encoding device comprising:
a processor configured to:
segment an area including points representing a three-dimensional (3D) point cloud into multiple voxels,
identify neighboring voxels that are proximate to each of the multiple voxels that include at least one of the points of the 3D point cloud, wherein each of the neighboring voxels that are identified includes at least one of the points of the 3D point cloud, wherein a quantity of the neighboring voxels that are proximate to one voxel of the multiple voxels is limited based on at least one of:
a predefined distance from the one voxel of the multiple voxels, and
a predefined quantity of points inside the neighboring voxels,
generate, for the 3D point cloud, a plurality of initial patches,
identify a number of scores for each of the points of the 3D point cloud including a first point, the scores for the first point relate angles between (i) a normal vector, which is perpendicular to a surface of the 3D point cloud, of the first point, and (ii) a unit vector of each projection plane of multiple projection planes that surround the point cloud,
identify a normal score for each of the points of the 3D point cloud based on a comparison of the scores associated with each respective point of the 3D point cloud,
identify a smoothing score for each of the multiple voxels that include at least one of the points of the 3D point cloud, wherein the smoothing score is based on a number of points in a voxel that correspond to different projection planes of the multiple projection planes,
assign, over multiple iterations, each point of the 3D point cloud to one of the multiple projection planes to generate refined patches that represent the 3D point cloud, wherein a first of the multiple iterations assign each point to one of the multiple projection planes based on the normal score of each respective point, and each subsequent iteration assigns a portion of the points to another one of the multiple projection planes based the smoothing score and a previous assignment,
generate two-dimensional (2D) frames that include pixels that represent the refined patches, and
encode the 2D frames using video compression coding to generate a bitstream; and
a communication interface operably coupled to the processor, the communication interface configured to transmit the bitstream.

2. The encoding device of claim 1, wherein:
the refined patches are generated based on the plurality of initial patches; and
to generate the plurality of initial patches, the processor is configured to:
identify the normal vector for each of the points of the 3D point cloud that is perpendicular to an external surface of the 3D point cloud, and
generate the initial patches by grouping each of the points of the 3D point cloud to one of the multiple projection planes that the normal vector is directed towards.

3. The encoding device of claim 1, wherein to identify the smoothing score, the processor is configured to:
identify a set of smoothing scores for each of the multiple voxels that include at least one of the points of the 3D point cloud; and
identify the smoothing score for one voxel of the multiple voxels by combining the set of smoothing scores of the one voxel with additional sets of smoothing scores of the neighboring voxels that are proximate to the one voxel.

4. The encoding device of claim 3, wherein the set of smoothing scores for the one voxel indicates a number of points within a respective voxel that are grouped to each of the projection planes as indicated by the initial patches.

5. The encoding device of claim 1, wherein to identify the normal score, the processor is configured to:
identify the normal vector of the first point of the 3D point cloud, the normal vector is perpendicular to an external surface of the 3D point cloud; and
compare the normal vector of the first point to the unit vector of each of the multiple projection planes to identify the normal score of the first point.

6. The encoding device of claim 1, wherein the processor is configured to:
identify a final score for each of the points of the 3D point cloud with respect to the multiple projection planes, wherein the final score is based on a weighted combination of the normal score and the smoothing score and relates each of the points to a particular projection plane of the multiple projection planes; and
group each point of the 3D point cloud to one of the multiple projection planes based on the final score, to generate the refined patches.

7. The encoding device of claim 6, wherein after identifying the final score, the processor is further configured to:
compare a current iteration for generating the refined patches to a predefined number of iterations; and
generate the 2D frames that include the pixels when the current iteration matches the predefined number of iterations.

8. The encoding device of claim 1, wherein the processor is further configured to:
identify each voxel of the multiple voxels that include at least one of the points of the 3D point cloud; and
generate an index that identifies the points of the 3D point cloud that are within each of the multiple voxels.

9. A method for point cloud encoding, the method comprising:
segmenting an area including points representing a three-dimensional (3D) point cloud into multiple voxels;

identifying neighboring voxels that are proximate to each of the multiple voxels that include at least one of the points of the 3D point cloud, wherein each of the neighboring voxels that are identified include at least one of the points of the 3D point cloud, wherein a quantity of the neighboring voxels that are proximate to one voxel of the multiple voxels is limited based on at least one of:
- a predefined distance from the one voxel of the multiple voxels, and
- a predefined quantity of points inside the neighboring voxels;

generating, for the 3D point cloud, a plurality of initial patches;

identify a number of scores for each of the points of the 3D point cloud including a first point, the scores for the first point relate angles between (i) a normal vector, which is perpendicular to a surface of the 3D point cloud, of the first point, and (ii) a unit vector of each projection plane of multiple projection planes that surround the point cloud;

identifying a normal score for each of the points of the 3D point cloud, based on a comparison of the scores associated with each respective point of the 3D point cloud;

identifying a smoothing score for each of the multiple voxels that include at least one of the points of the 3D point cloud, wherein the smoothing score is based on a number of points in a voxel that correspond to different projection planes of the multiple projection planes;

assigning, over multiple iterations, each point of the 3D point cloud to one of multiple projection planes to generate refined patches that represent the 3D point cloud, wherein a first of the multiple iterations assign each point to one of the multiple projection planes based on the normal score of each respective point, and each subsequent iteration assigns a portion of the points to another one of the multiple projection planes based the smoothing score and a previous assignment;

generating two-dimensional (2D) frames that include pixels that represent the refined patches;

encoding the 2D frames using video compression coding to generate a bitstream; and transmitting the bitstream.

10. The method of claim 9, wherein:
the refined patches are generated based on the plurality of initial patches; and
generating the plurality of initial patches comprises:
  identify the normal vector for each of the points of the 3D point cloud that is perpendicular to an external surface of the 3D point cloud, and
  generate the initial patches by grouping each of the points of the 3D point cloud to one of the multiple projection planes that the normal vector is directed towards.

11. The method of claim 9, wherein identifying the smoothing score comprises:
identifying a set of smoothing scores for each of the multiple voxels that include at least one of the points of the 3D point cloud; and
identifying the smoothing score for one voxel of the multiple voxels by combining the set of smoothing scores of the one voxel with additional sets of smoothing scores of the neighboring voxels that are proximate to the one voxel.

12. The method of claim 11, wherein the set of smoothing scores for the one voxel indicates a number of points within a respective voxel that are grouped to each of the projection planes as indicated by the initial patches.

13. The method of claim 9, wherein identifying the normal score comprises:
identifying the normal vector of the first point of the 3D point cloud, the normal vector is perpendicular to an external surface of the 3D point cloud; and
comparing the normal vector of the first point to the unit vector of each of the multiple projection planes to identify the normal score of the first point.

14. The method of claim 9, further comprising:
identifying a final score for each of the points of the 3D point cloud with respect to the multiple projection planes, wherein the final score is based on a weighted combination of the normal score and the smoothing score and relates each of the points to a particular projection plane of the multiple projection planes; and
grouping each point of the 3D point cloud to one of the multiple projection planes based on the final score, to generate the refined patches.

15. The method of claim 14, further comprising
after the final score is identified, comparing a current iteration for generating the refined patches to a predefined number of iterations; and
generate the 2D frames that include the pixels when the current iteration matches the predefined number of iterations.

16. The method of claim 9, further comprising:
identifying each voxel of the multiple voxels that include at least one of the points of the 3D point cloud; and
generating an index that identifies the points of the 3D point cloud that are within each of the multiple voxels.

* * * * *